United States Patent
Rotem et al.

(10) Patent No.: US 12,265,440 B2
(45) Date of Patent: *Apr. 1, 2025

(54) SYSTEM, APPARATUS AND METHOD FOR LOOSE LOCK-STEP REDUNDANCY POWER MANAGEMENT

(71) Applicant: Intel Corporation, Santa Clara, CA (US)

(72) Inventors: Efraim Rotem, Haifa (IL); Eliezer Weissmann, Haifa (IL); Doron Rajwan, Rishon Le-Zion (IL); Nir Rosenzweig, Givat Ella (IL); Yoni Aizik, Haifa (IL)

(73) Assignee: Intel Corporation, Santa Clara, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 18/455,008

(22) Filed: Aug. 24, 2023

(65) Prior Publication Data

US 2023/0393641 A1 Dec. 7, 2023

Related U.S. Application Data

(63) Continuation of application No. 17/824,984, filed on May 26, 2022, now Pat. No. 11,740,682, which is a continuation of application No. 17/210,759, filed on Mar. 24, 2021, now Pat. No. 11,402,891, which is a continuation of application No. 16/663,645, filed on Oct. 25, 2019, now Pat. No. 10,990,154, which is a continuation of application No. 16/546,441, filed on Aug. 21, 2019, now Pat. No. 10,963,034, which is a (Continued)

(51) Int. Cl.
*G06F 1/00* (2006.01)
*G06F 1/324* (2019.01)
*G06F 1/3296* (2019.01)

(52) U.S. Cl.
CPC ............ *G06F 1/324* (2013.01); *G06F 1/3296* (2013.01)

(58) Field of Classification Search
CPC ...... G06F 1/324; G06F 1/3296; Y02D 10/009
See application file for complete search history.

(56) References Cited

U.S. PATENT DOCUMENTS 5,163,153 A 11/1992 Cole et al.
5,522,087 A 5/1996 Hsiang
(Continued)

FOREIGN PATENT DOCUMENTS

EP 1 282 030 A1 5/2003

OTHER PUBLICATIONS

Non-Final Office Action issued Feb. 13, 2019 for U.S. Appl. No. 15/635,307, 11 pages.

(Continued)

*Primary Examiner* — Nitin C Patel
(74) *Attorney, Agent, or Firm* — Schwabe, Williamson & Wyatt, P.C.

(57) ABSTRACT

A processor includes a plurality of cores, at least two of which may execute redundantly, a configuration register to store a first synchronization domain indicator to indicate that a first core and a second core are associated with a first synchronization domain, and a power controller having a synchronization circuit to cause a dynamic adjustment to a frequency of at least one of the first and second cores to cause these cores to operate at a common frequency, based at least in part on the first synchronization domain indicator.

20 Claims, 20 Drawing Sheets

Related U.S. Application Data continuation of application No. 15/635,307, filed on Jun. 28, 2017, now Pat. No. 10,429,919.

(56) References Cited

U.S. PATENT DOCUMENTS

| | | | |
|---|---|---|---|
| 5,590,341 A | 12/1996 | Matter | |
| 5,621,250 A | 4/1997 | Kim | |
| 5,931,950 A | 8/1999 | Hsu | |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,996,728 B2 | 2/2006 | Singh | |
| 7,010,708 B2 | 3/2006 | Ma | |
| 7,043,649 B2 | 5/2006 | Terrell | |
| 7,055,060 B2 | 5/2006 | Nguyen et al. | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,296,181 B2 | 11/2007 | Safford et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 10,379,596 B2 | 8/2019 | Weissmann et al. | |
| 10,990,154 B2 | 4/2021 | Rotem et al. | |
| 10,990,155 B2 | 4/2021 | Rotem et al. | |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0022348 A1 | 1/2007 | Racunas et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0168712 A1 | 7/2007 | Racunas et al. | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0136397 A1 | 6/2008 | Gunther | |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2011/0154090 A1 | 6/2011 | Dixon et al. | |
| 2012/0079290 A1 | 3/2012 | Kumar | |
| 2012/0246506 A1 | 9/2012 | Knight | |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishnan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |
| 2013/0346774 A1 | 12/2013 | Bhandaru et al. | |
| 2014/0068290 A1 | 3/2014 | Bhandaru et al. | |
| 2014/0173247 A1 | 6/2014 | Litovtcherko et al. | |
| 2014/0195829 A1 | 7/2014 | Bhandaru et al. | |
| 2014/0208141 A1 | 7/2014 | Bhandaru et al. | |
| 2015/0067310 A1 | 3/2015 | Henry | |
| 2015/0248138 A1 | 9/2015 | Feero | |
| 2020/0057481 A1 | 2/2020 | Rotem et al. | |

OTHER PUBLICATIONS

Notice of Allowance issued May 22, 2019 for U.S. Appl. No. 15/635,307, 11 pages.
Non-Final Office Action issued Sep. 1, 2020 for U.S. Appl. No. 16/546,441, 19 pages.
Notice of Allowance issued Dec. 9, 2020 for U.S. Appl. No. 16/546,441, 8 pages.
Non-Final Office Action issued Sep. 23, 2020 for U.S. Appl. No. 16/663,645, 17 pages.
Notice of Allowance issued Jan. 11, 2021 for U.S. Appl. No. 16/663,645, 9 pages.
Notice of Allowance issued Apr. 1, 2022 for U.S. Appl. No. 17/210,759, 8 pages.
Notice of Allowance issued Apr. 18, 2023 for U.S. Appl. No. 17/824,984, 10 pages.
Intel Developer Forum, IDF2010, Opher Kahn, et al., "Intel Next Generation Microarchitecture Codename Sandy Bridge: New Processor Innovations," Sep. 13, 2010, 58 pages.
SPEC-Power and Performance, Design Overview V1.10, Standard Performance Information Corp., Oct. 21, 2008, 6 pages.
Intel Technology Journal, "Power and Thermal Management in the Intel Core Duo Processor," May 15, 2006, pp. 109-122.
Anoop Iyer, et al., "Power and Performance Evaluation of Globally Asynchronous Locally Synchronous Processors," 2002, pp. 1-11.
Greg Semeraro, et al., "Hiding Synchronization Delays in a GALS Processor Microarchitecture," 2004, pp. 1-13.
Joan-Manuel Parcerisa, et al., "Efficient Interconnects for Clustered Microarchitectures," 2002, pp. 1-10.
Grigorios Magklis, et al., "Profile-Based Dynamic Voltage and Frequency Scalling for a Multiple Clock Domain Microprocessor," 2003, pp. 1-12.
Greg Semeraro, et al., "Dynamic Frequency and Voltage Control for a Multiple Clock Domain Architecture," 2002, pp. 1-12.
Greg Semeraro, "Energy-Efficient Processor Design Using Multiple Clock Domains with Dynamic Voltge and Frequency Scaling," 2002, pp. 29-40.
Diana Marculescu, "Application Adaptive Energy Efficient Clustered Architecture," 2004, pp. 344-349.
L. Benini, et al., "System-Level Dynamic Power Management," 1999, pp. 23-31.
Ravindra Jejurikar, et al., "Leakage Aware Dynamic Voltage Scaling For Real-Time Embedded Systems," 2004, pp. 275-280.
Ravindra Jejurikar, et al., "Dynamic Slack Reclamation With Procrastination Scheduling in Real-Time Embedded Systems,"2005, pp. 13-17.
R. Todling, et al., "Some Strategies For Kalman Filtering and Smoothing," 1996, pp. 1-21.
R.E. Kalman, "A New Approach to Linear Filtering and Prediction Problems," 1960, pp. 1-12.
Intel Corporation, "Intel 64 and IA-32 Architectures Software Developer's Manual," vol. 38: System Programming Guide, Part 2, Apr. 2016, Chapter 14 Power and Thermal Management (14.1-14. 9.5), 39 pages.
Intel Corporation, "Intel 64 and IA-32 Architectures Software Developer's Manual," vol. 3: (3A, 3B & 3C): System Programming Guide, Feb. 2014, Chapter 14 Power and Thermal Management (14.1-14.9.5), 44 pages.

(56) References Cited

OTHER PUBLICATIONS

International Searching Authority, "Notification of Transmittal of the International Search Report and the Written Opinon of the International Seasrching Authoirty," mailed Sep. 5, 2018, in International Application No. PCT/US2018/035042.
M. Baumeister, Using Decoupled Parallel Mode for Safety Applications, Freescale Semiconductor, Doc MP564XLWP, Rev. 0, 2009, pp. 1-18.

1100

SYSTEM, APPARATUS AND METHOD FOR LOOSE LOCK-STEP REDUNDANCY POWER MANAGEMENT

CROSS-REFERENCE TO RELATED APPLICATION

This application is a continuation of U.S. patent application Ser. No. 17/824,984, filed May 26, 2022, now U.S. Pat. No. 11,740,682, issued Aug. 29, 2023; which is a continuation of U.S. patent application Ser. No. 17/210,759, filed Mar. 24, 2021; now U.S. Pat. No. 11,402,891, issued Aug. 2, 2022, which is a continuation of U.S. patent application Ser. No. 16/663,645, filed Oct. 25, 2019, now U.S. Pat. No. 10,990,154, issued Apr. 27, 2021, which is a continuation of U.S. patent application Ser. No. 16/546,441, filed Aug. 21, 2019, now U.S. Pat. No. 10,963,034, issued Mar. 30, 2021, which is a continuation of U.S. patent application Ser. No. 15/635,307, filed Jun. 28, 2017, now U.S. Pat. No. 10,429,919, issued Oct. 1, 2019 the content of which is hereby incorporated by reference.

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology.

DETAILED DESCRIPTION

Figure 1:
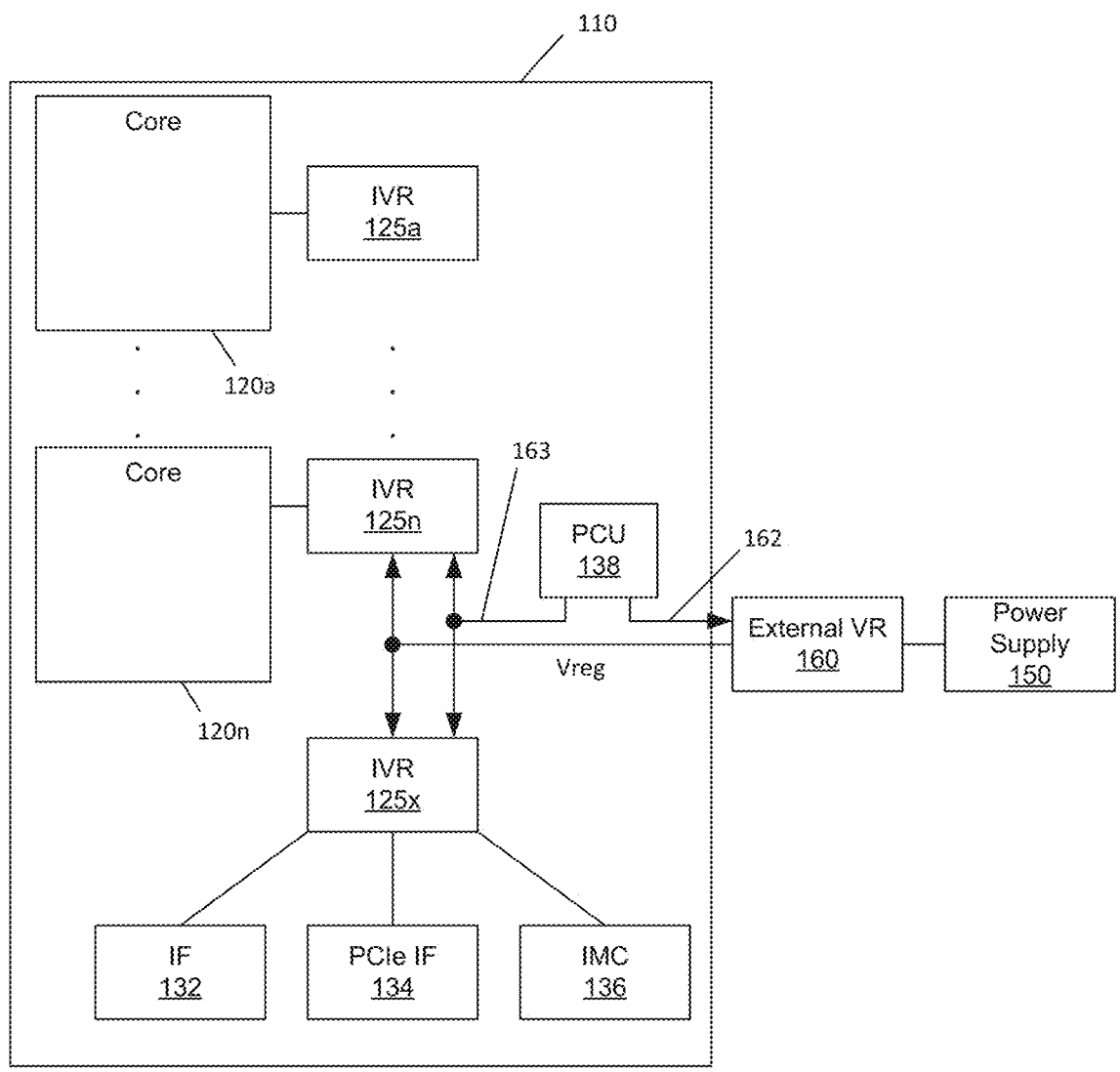
FIG. 1 is a block diagram of a portion of a system in accordance with an embodiment of the present invention.

In various embodiments, a processor may be controlled with techniques to enable multiple cores or other processing engines of the processor to operate in a loose lock-step manner with regard to performance state (P-state) management, e.g., for applications using software-based redundancy. In this way, cores in redundant execution can perform redundancy checks in a timely and power efficient manner. Still further, this loose lock-step P-state control can be performed dynamically during processor execution such that cores can dynamically enter into and exit from common P-state control, as described herein.

In some cases, this loose lock-step P-state control can be used during execution of compute applications that have functional safety (FuSa) requirements. In such cases, FuSa requirements may be met without incurring the expense and overhead of other techniques such as array error correction coding (ECC), end-to-end bus parity, etc. Still further, using an embodiment as described herein, redundant operation can be realized without complicated lockstep operation. In this way, power management operations, which may constantly change voltage and frequency of cores according to changing ambient conditions, workload and system configuration, can occur on cores involved in redundant execution, without setting a fixed frequency to the cores. Note that as used herein, the term "redundant execution" or similar terms includes execution of the same code on multiple cores or other processing engines, and further includes execution of different code collaboratively on such multiple cores or processing engines, for example, by way of execution of main code and checker code.

More specifically, loose lock-step P-state control may occur by enabling cores to operate dynamically, either with per core P-state (PCPS) control or loose lock-step control in which multiple cores can be dynamically controlled to operate with a given P-state such that a cluster of cores are controlled to operate at the same frequency. Note that even with loose lock-step control as described herein, other cores of a processor may operate at independent P-states. In some embodiments, loose lock-step control may be realized by sending the same performance state command (e.g., via a broadcast message) concurrently to a selected set of cores within a given domain or cluster. Note that this command does not guarantee cycle accurate synchronization, and some variance due to internal communication is acceptable. In embodiments, this variance may be bounded to guarantee proper functionality. In other embodiments cycle accurate synchronization may occur.

As described herein, the term "synchronization domain" is used to refer to a collection of multiple cores or other processing engines that are dynamically controlled to operate at the same (or substantially) the same frequency and/or voltage, in response to a given condition. However, understand that this synchronization domain does not necessarily correspond to a "power domain," which is collection of cores or other processing engines having a physical relationship and are statically controlled to operate at least at the same frequency point (and possibly same voltage). This is the case, as instead this synchronization domain is a dynamically controllable capability that may flexibly be enabled and disabled during runtime based on the given condition. Note also that while these cores or other processing engines are controlled to operate with (at least) substantially the same operating parameters, this control is performed in a loose lock-step manner, such that any changes or updates to frequency and/or voltage may not occur identically or concurrently, and instead may occur within a relatively small time duration. In embodiments this time duration may be, e.g., a bounded or predetermined number of execution cycles. For example, this bounded number of execution cycles may range between approximately 1 and 10,000 cycles, to ensure that redundantly executed tasks, strands, threads or so forth execute at least substantially contemporaneously on two or more cores or other processing engines. In this way, results (including interim results) may be returned within a relatively small time window (e.g., within a predetermined minimal bound of execution cycles), so that identical (or at least substantially identical) results may be confirmed and further execution is allowed to proceed.

In one embodiment, an example architectural interface to communicate the synchronization domain capability and control can implemented within a hardware P-state (HWP) thread-level machine specific register (MSR), such as by way of a synchronization domain field of this register. In such an embodiment, this register may be written at schedule time of a given thread. In this use case, a 4-bit field (for example) can support up to 15 synchronization domains (with a default value of, e.g., zero, to indicate that the core is not a member of any synchronization domain). In an alternate embodiment, a single package MSR can be provided with (e.g.,) a 4-bit domain field per core. In such cases, in each schedule period, a scheduler such as an operating system (OS) scheduler updates the core MSR with the domain notification. This data is transferred to a power controller, which, responsive to such update, may trigger the synchronization frequency control during a power management evaluation.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blademicro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage Vreg to processor 110.

As seen, processor 110 may be a single die processor including multiple cores 120a-120n. In addition, each core may be associated with an integrated voltage regulator (IVR) 125a-125n which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered. Similarly, cores 120 may include or be associated with independent clock generation circuitry such as one or more phase lock loops (PLLs) to control operating frequency of each core 120 independently.

Still referring to FIG. 1, additional components may be present within the processor including an input/output interface (IF) 132, another interface 134, and an integrated memory controller (IMC) 136. As seen, each of these components may be powered by another integrated voltage regulator 125$_x$. In one embodiment, interface 132 may enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include circuitry including hardware, software and/or firmware to perform power management operations with regard to processor 110. As seen, PCU 138 provides control information to external voltage regulator 160 via a digital interface 162 to cause the voltage regulator to generate the appropriate regulated voltage. PCU 138 also provides control information to IVRs 125 via another digital interface 163 to control the operating voltage generated (or to cause a corresponding IVR to be disabled in a low power mode). In various embodiments, PCU 138 may include a variety of power management logic units or circuits to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software). PCU 138 may be configured to control multiple cores or other processing circuits to dynamically enter into and exit from synchronization domains such that these collection of circuits can operate in a loose lock-step manner as to P-states, as described herein.

In FIG. 1, PCU 138 is illustrated as being present as a separate circuit of the processor. In other cases PCU 138 may execute on a given one or more of cores 120. In some cases, PCU 138 may be implemented as a microcontroller (dedicated or general-purpose) or other control logic configured to execute its own dedicated power management code, sometimes referred to as P-code. In yet other embodiments, power management operations to be performed by PCU 138 may be implemented externally to a processor, such as by way of a separate power management integrated circuit (PMIC) or other component external to the processor. In yet other embodiments, power management operations to be performed by PCU 138 may be implemented within BIOS or other system software.

Embodiments may be particularly suitable for a multicore processor in which each of multiple cores can operate at an independent voltage and frequency point. As used herein the term "domain" is used to mean a collection of hardware and/or logic that operates at the same voltage and frequency point. In addition, a multicore processor can further include other non-core processing engines such as fixed function units, graphics engines, and so forth. Such processor can include independent domains other than the cores, such as one or more domains associated with a graphics engine (referred to herein as a graphics domain) and one or more domains associated with non-core circuitry, referred to herein as an uncore or a system agent. Although many implementations of a multi-domain processor can be formed on a single semiconductor die, other implementations can be realized by a multi-chip package in which different domains can be present on different semiconductor die of a single package.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited. For example, other regulated voltages may be provided to on-chip resources from external voltage regulator 160 or one or more additional external sources of regulated voltages.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic, overclocking, or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth). Note that using the demotion-based techniques herein, C-state requests from the OS can be overridden, based at least in part on customer tuning information provided via an interface as described herein.

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, CA, to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle.

Power management techniques also may be used when constraints exist in an operating environment. For example, when a power and/or thermal constraint is encountered, power may be reduced by reducing operating frequency and/or voltage. Other power management techniques include throttling instruction execution rate or limiting scheduling of instructions. Still further, it is possible for instructions of a given instruction set architecture to include express or implicit direction as to power management operations. Although described with these particular examples, understand that many other power management techniques may be used in particular embodiments.

Figure 2:
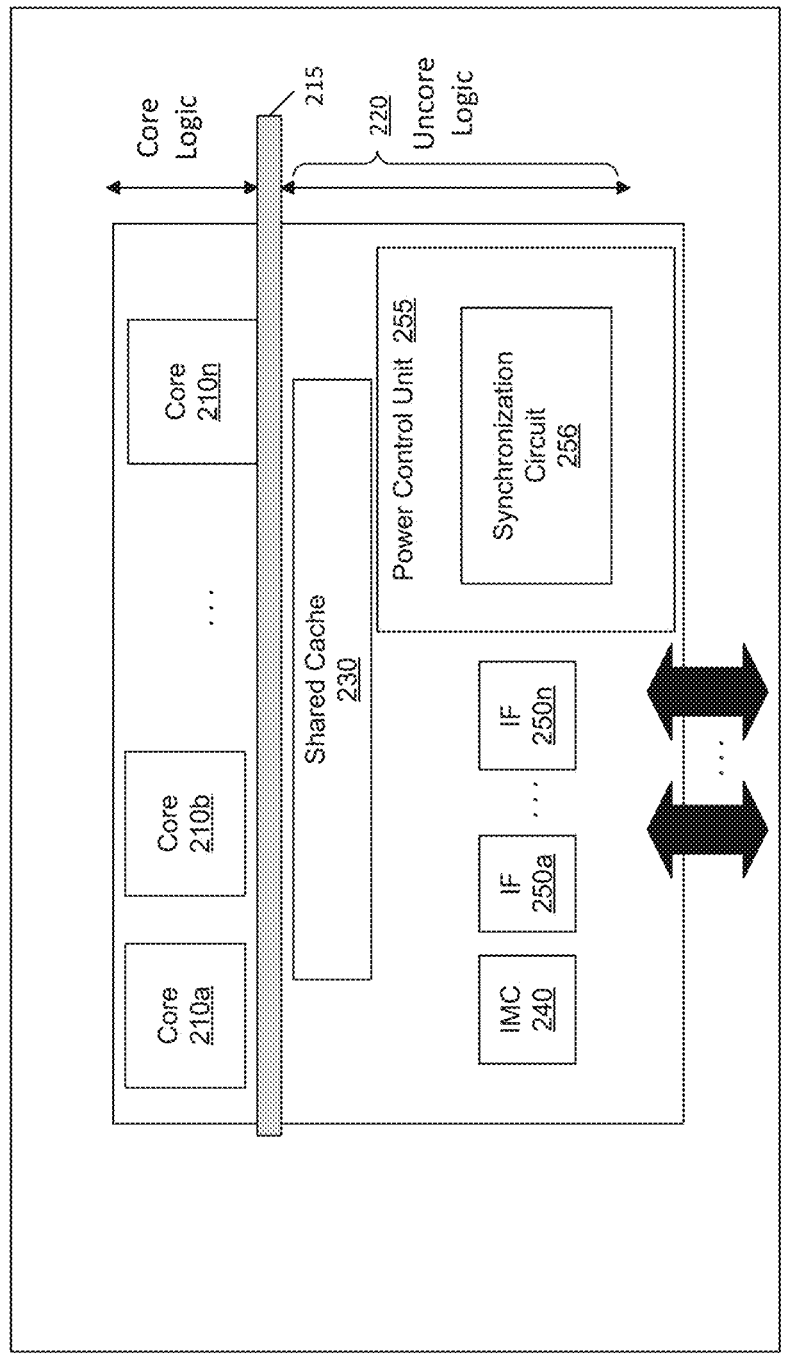
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores 210$_a$-210$_n$. In one embodiment, each such core may be of an independent power domain and can be configured to enter and exit active states and/or maximum performance states based on workload. One or more cores 210 may be heterogeneous to the other cores, e.g., having different micro-architectures, instruction set architectures, pipeline depths, power and performance capabilities. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform power management techniques, including the loose lock-step power management control as described herein. To this end, PCU 255 may include a synchronization circuit 256 that is configured to identify multiple cores or other processing circuits to be collected into a given synchronization domain and control operating points of these collected circuits to enable dynamic loose lock-step operation.

In addition, by interfaces 250$a$-250$n$, connection can be made to various off-chip components such as peripheral devices, mass storage and so forth. While shown with this particular implementation in the embodiment of FIG. 2, the scope of the present invention is not limited in this regard.

Figure 3:
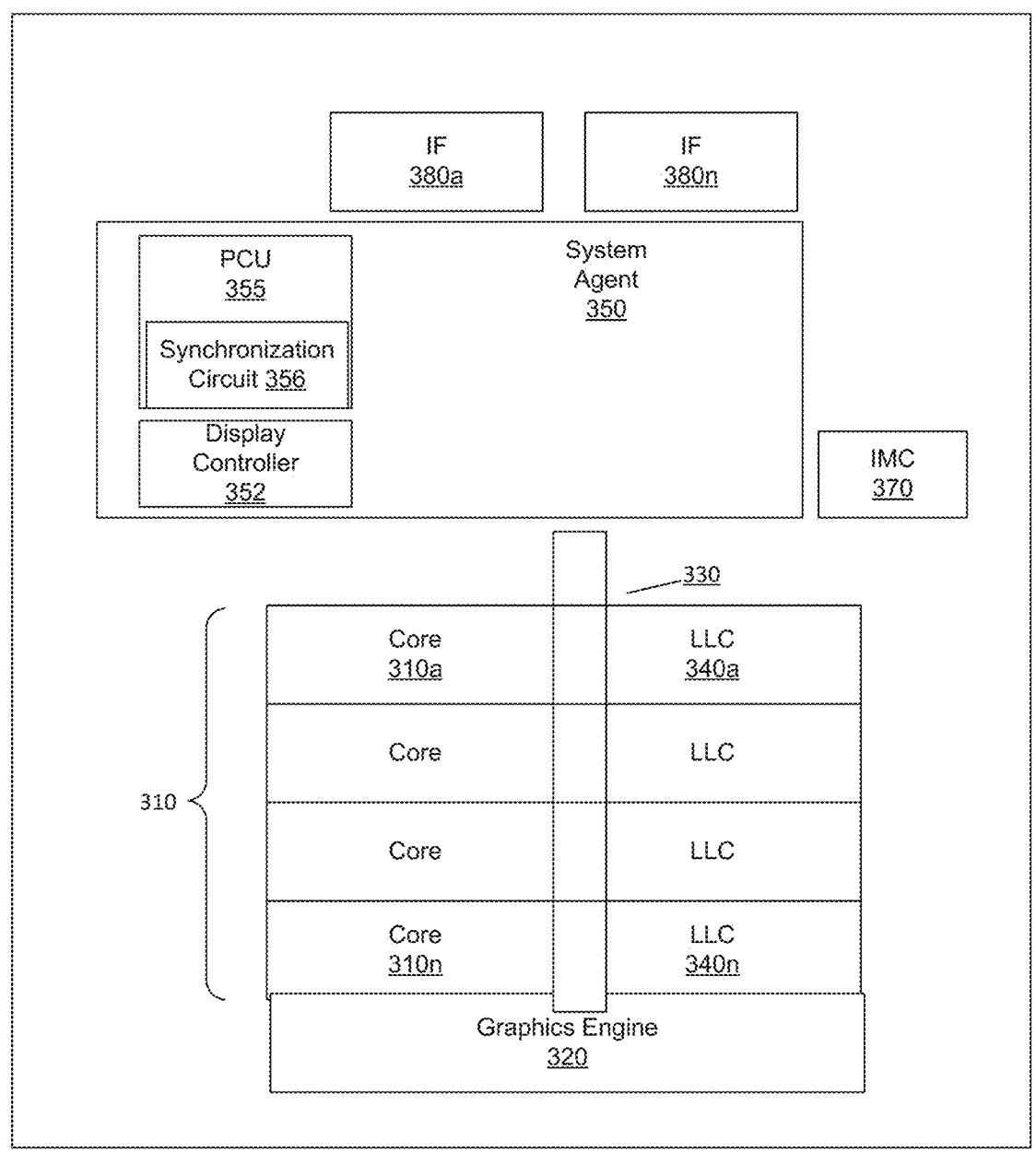
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores 310$a$-310$n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) 340$a$-340$n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform power management techniques, including dynamic loose lock-step control techniques described herein. To this end, PCU 355 includes a synchronization circuit 356 that is configured to identify multiple cores and/or other processing circuits to enter into a synchronization domain and be controlled to operate in a loose lock-step manner as described herein.

As further seen in FIG. 3, processor 300 can further include an integrated memory controller (IMC) 370 that can provide for an interface to a system memory, such as a dynamic random access memory (DRAM). Multiple interfaces 380$a$-380$n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
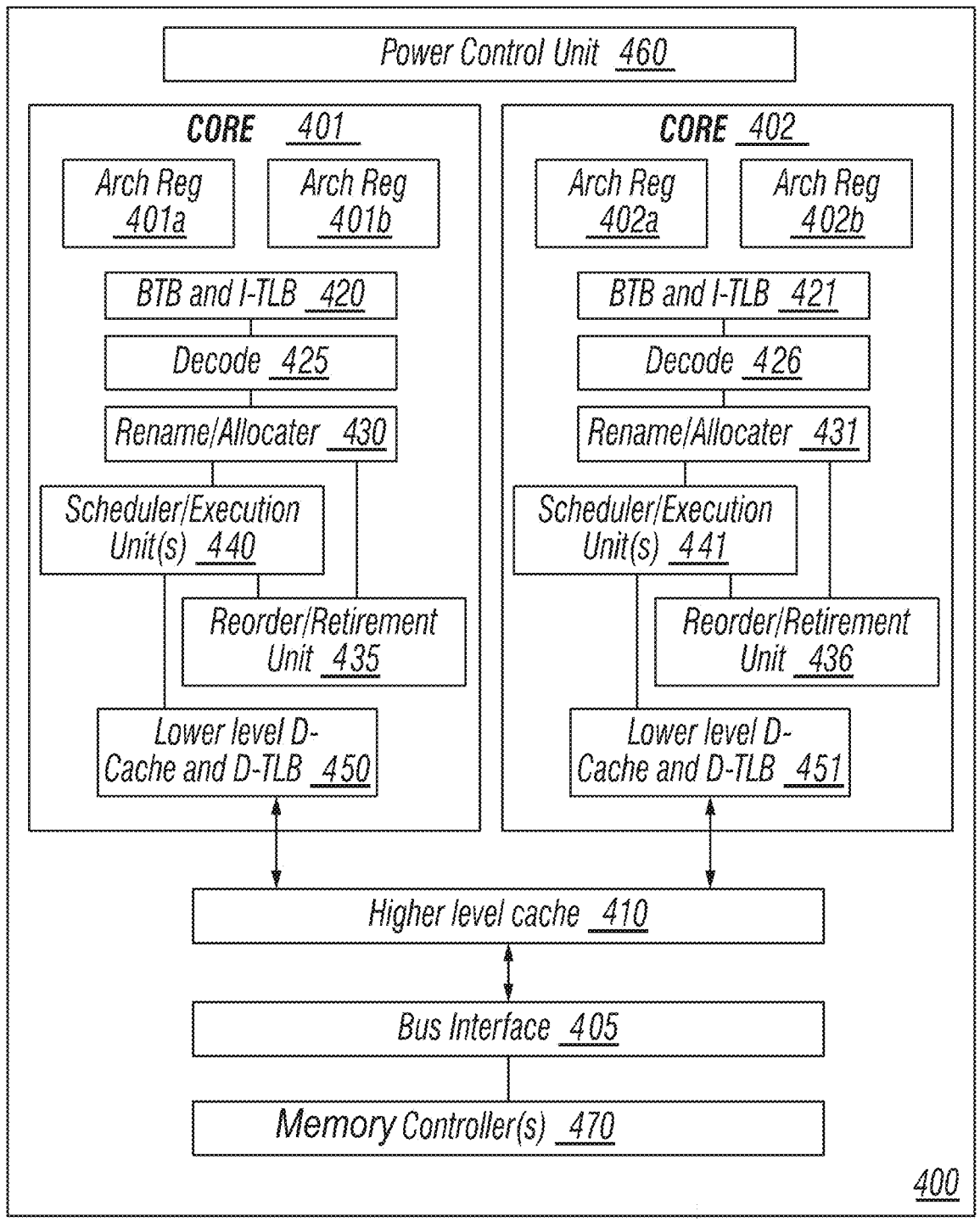
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, branch target buffer and instruction translation lookaside buffer (BTB and I-TLB) 420, load/store buffers, and queues may be shared through partitioning. Other resources, such as general purpose internal registers, page-table base register(s), low-level data-cache and data-TLB 450, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/ resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to a fetch unit to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation lookaside buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power control unit 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
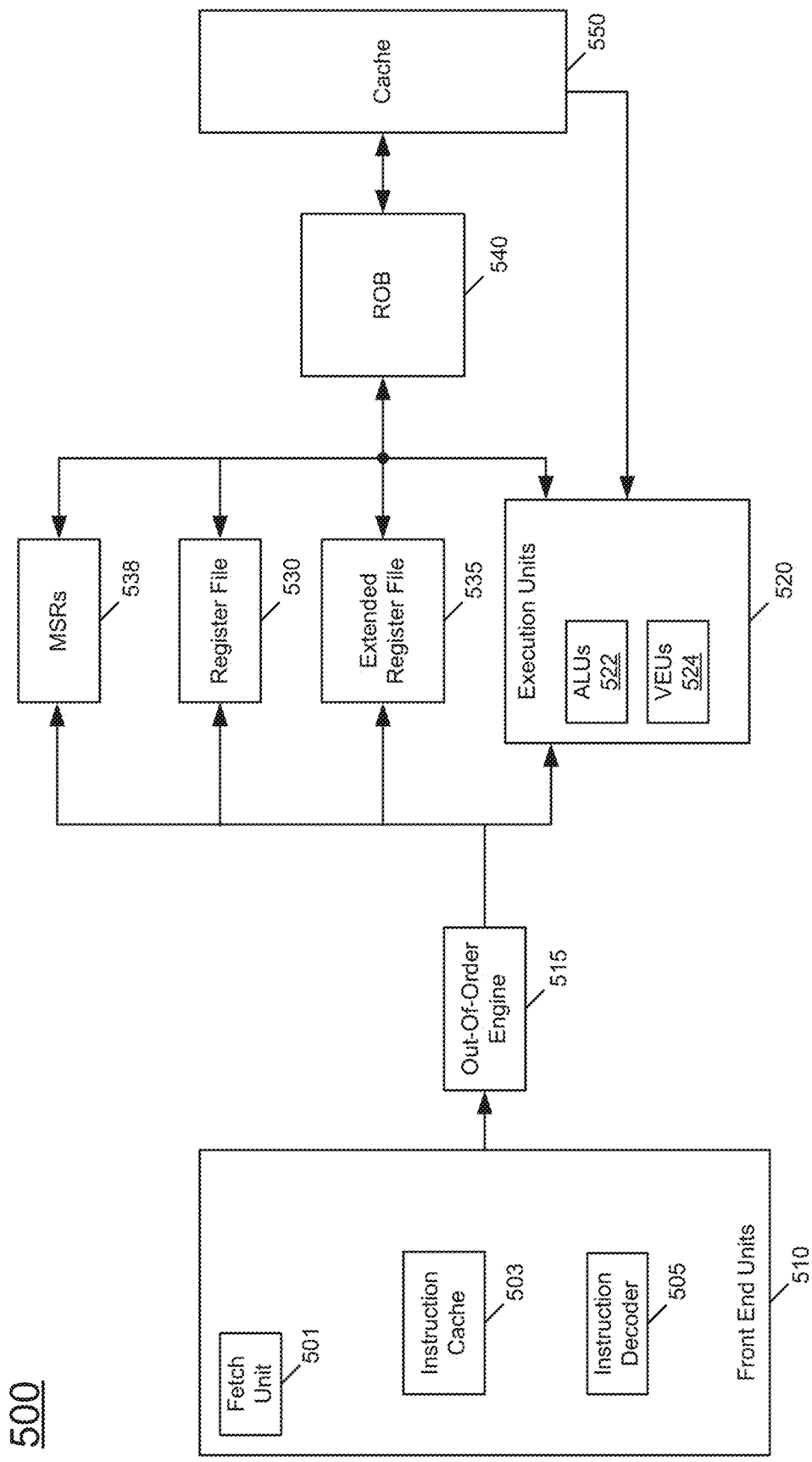
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core).

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
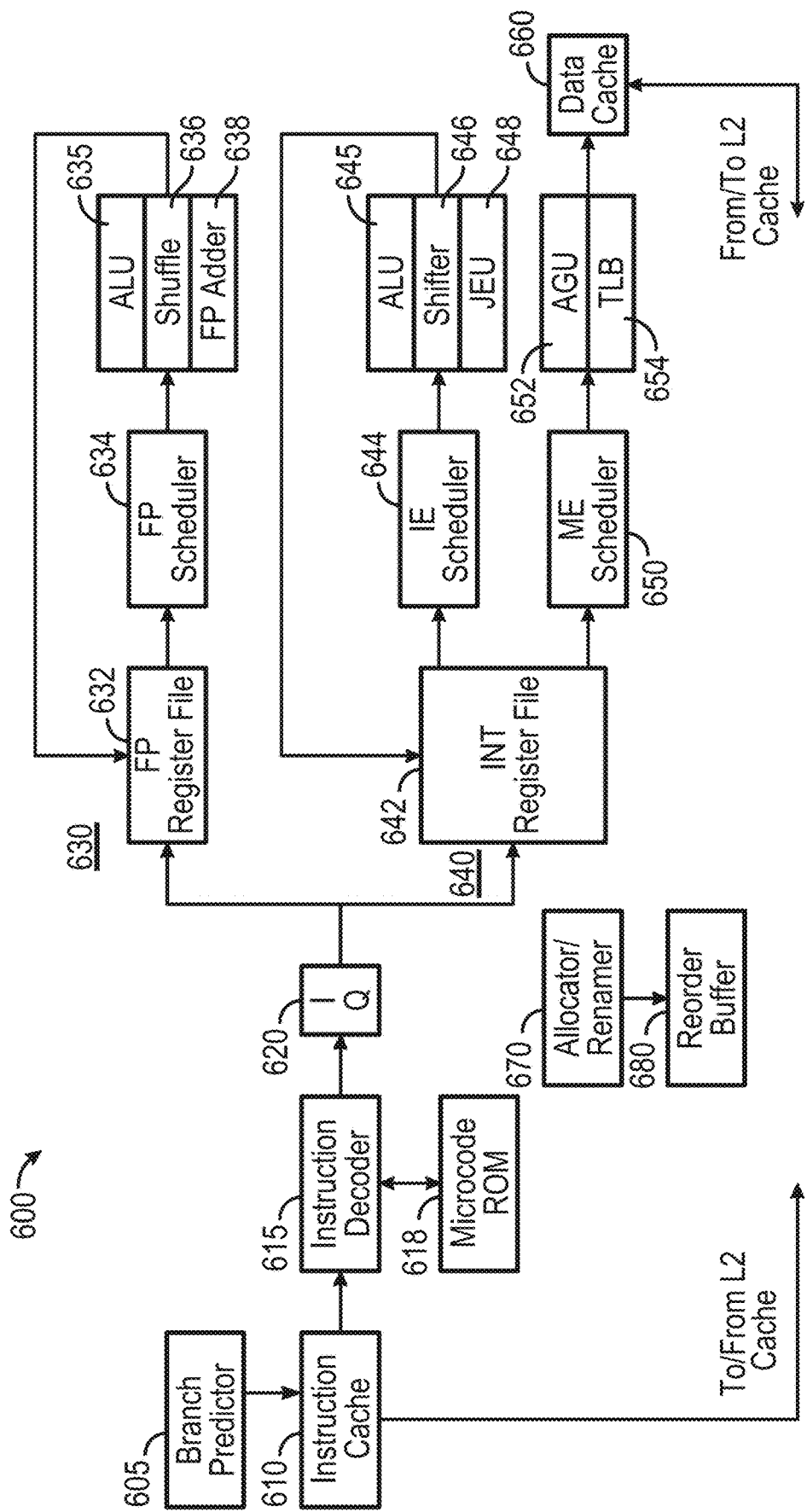
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue (IQ) 620 for storage and delivery to a given execution pipeline. A microcode ROM 618 is coupled to instruction decoder 615.

A floating point pipeline 630 includes a floating point (FP) register file 632 which may include a plurality of architectural registers of a given bit width such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer (INT) register file 642 which may include a plurality of architectural registers of a given bit width such as 128 or 256 bits. Pipeline 640 includes an integer execution (IE) scheduler 644 to schedule instructions for execution on one of multiple execution units of the pipeline. In the embodiment shown, such execution units include an ALU 645, a shifter unit 646, and a jump execution unit (JEU) 648. In turn, results generated in these execution units may be provided back to buffers and/or registers of register file 642. Of course understand while shown with these few example execution units, additional or different integer execution units may be present in another embodiment.

A memory execution (ME) scheduler 650 may schedule memory operations for execution in an address generation unit (AGU) 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
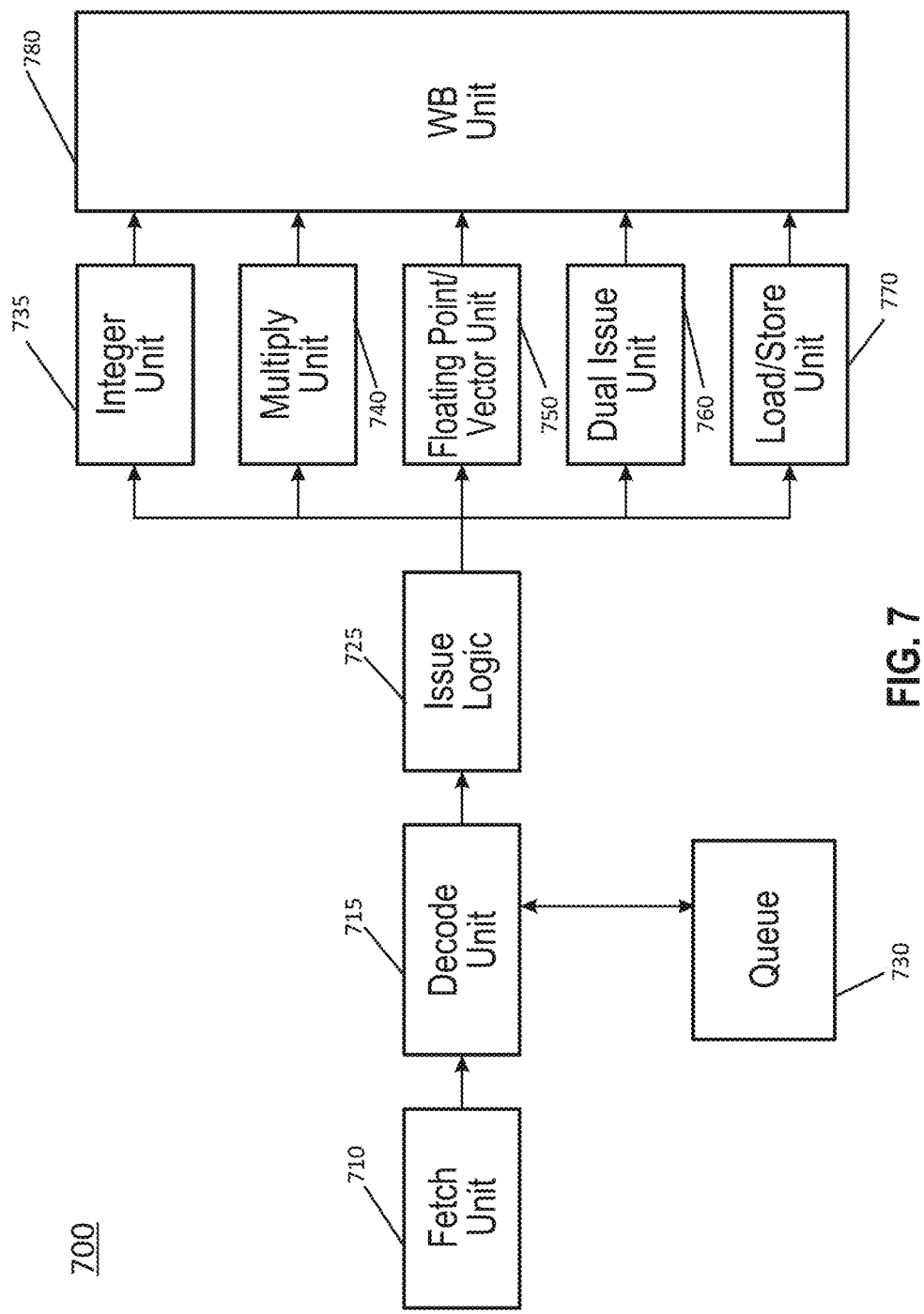
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, CA. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback (WB) unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
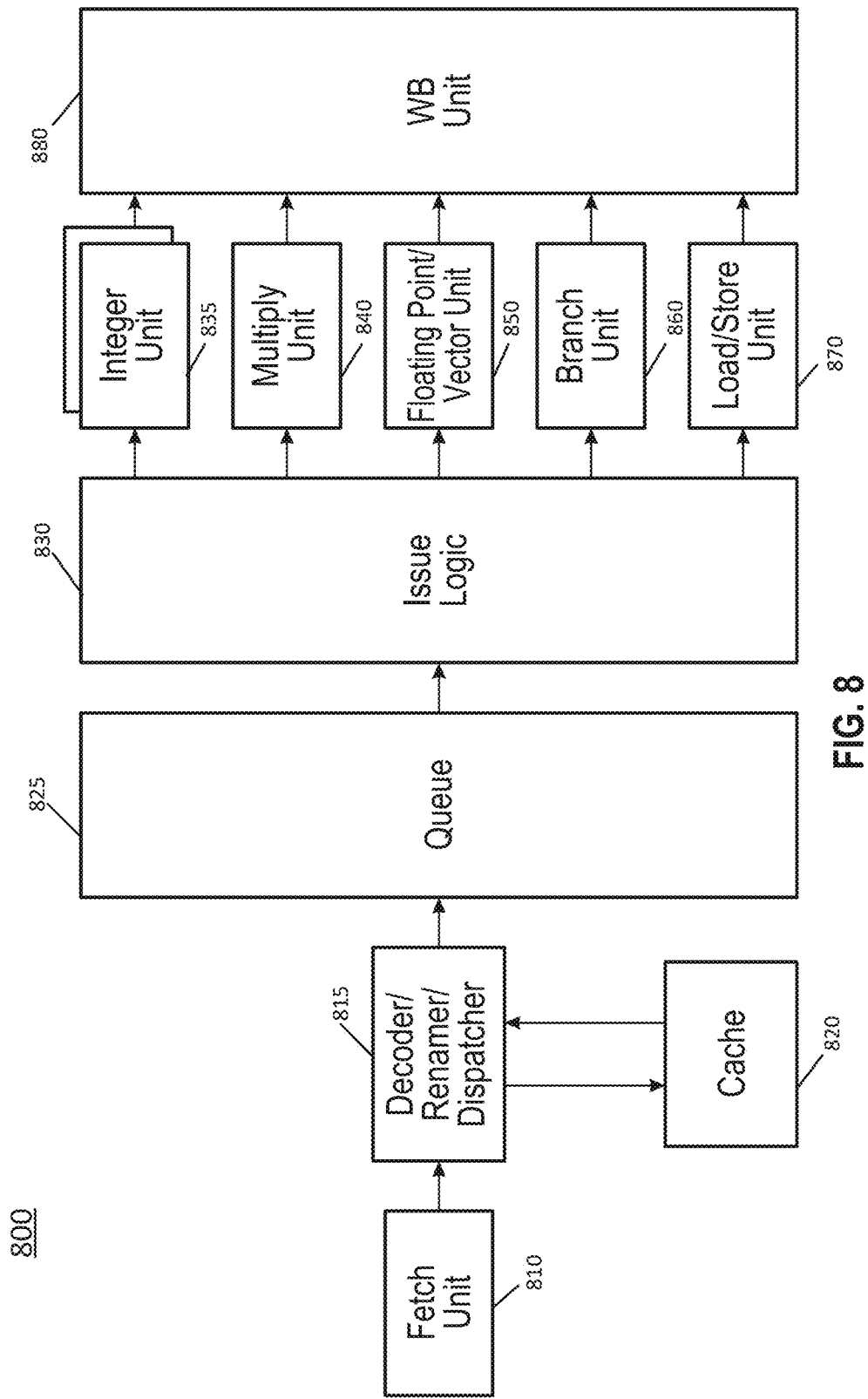
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher unit 815 coupled to a cache 820. Unit 815 may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples. Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
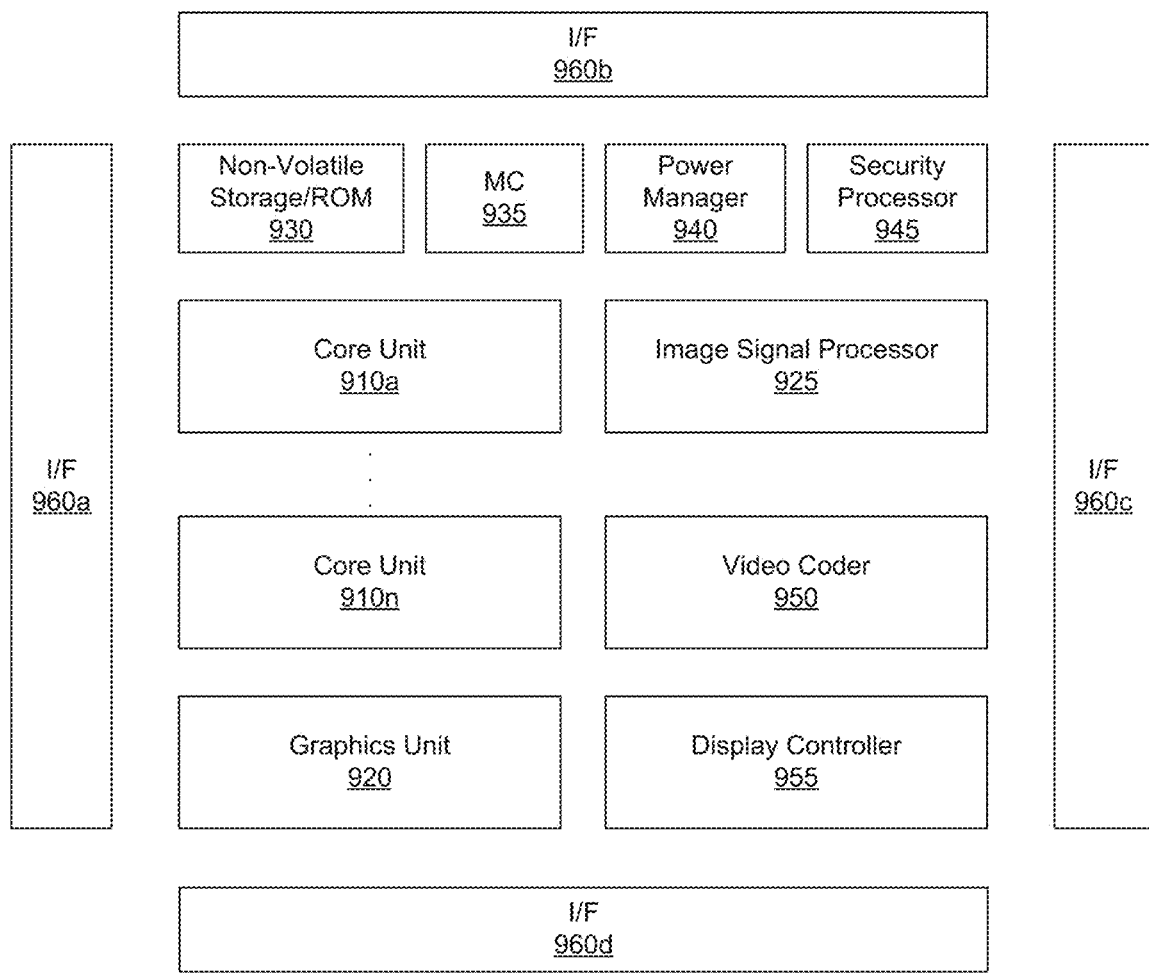
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, CA, an ARM-based design from ARM Holdings, Ltd. or licensee thereof or a MIPS-based design from MIPS Technologies, Inc. of Sunnyvale, CA, or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device, which may incorporate a heterogeneous system architecture having a heterogeneous system architecture-based processor design.

In the high level view shown in FIG. 9, processor 900 includes a plurality of core units 910a-910n. Each core unit may include one or more processor cores, one or more cache memories and other circuitry. Each core unit 910 may support one or more instruction sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level two (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
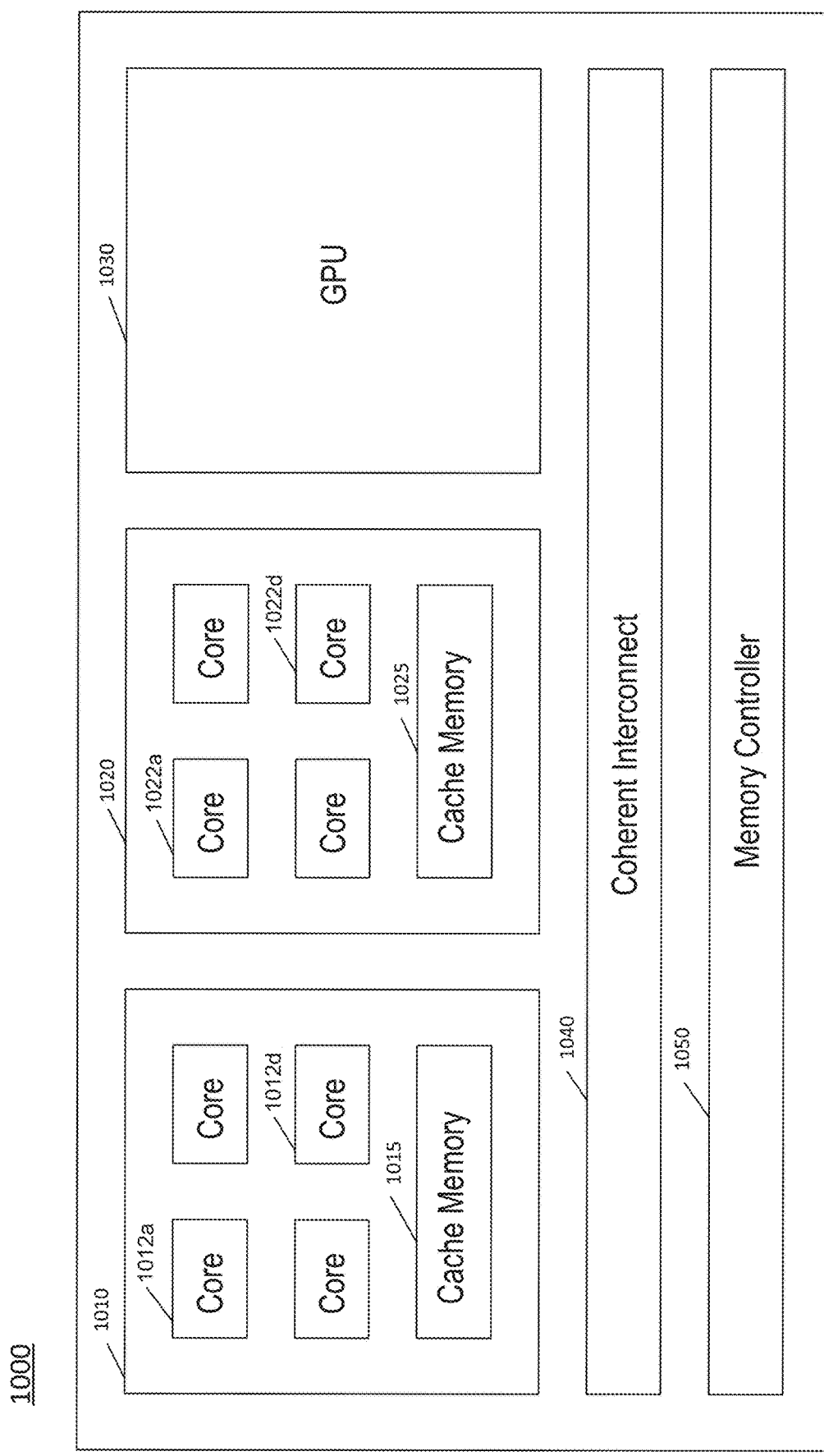
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores 1012a-1012d. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores 1022a-1022d. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
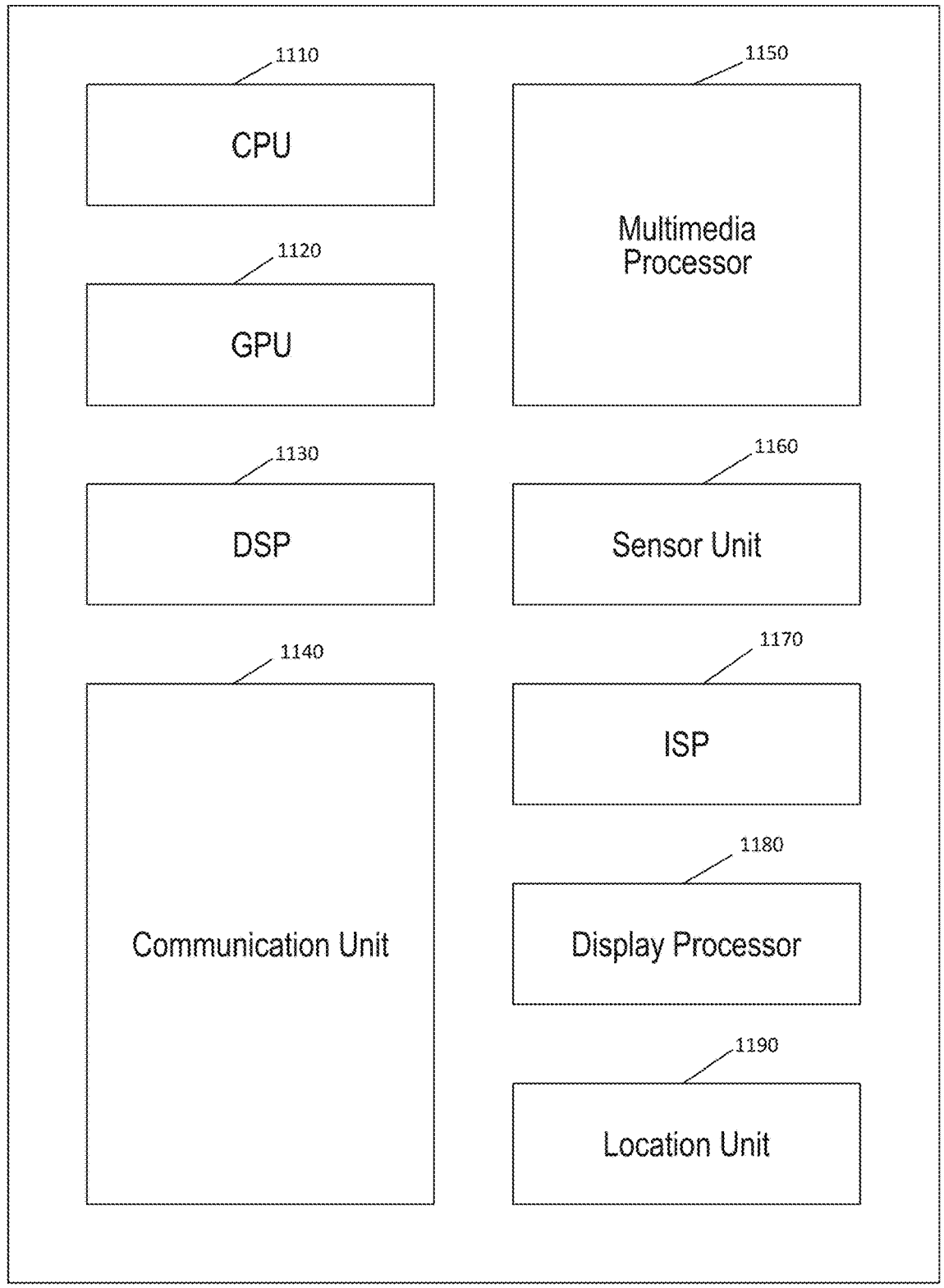
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
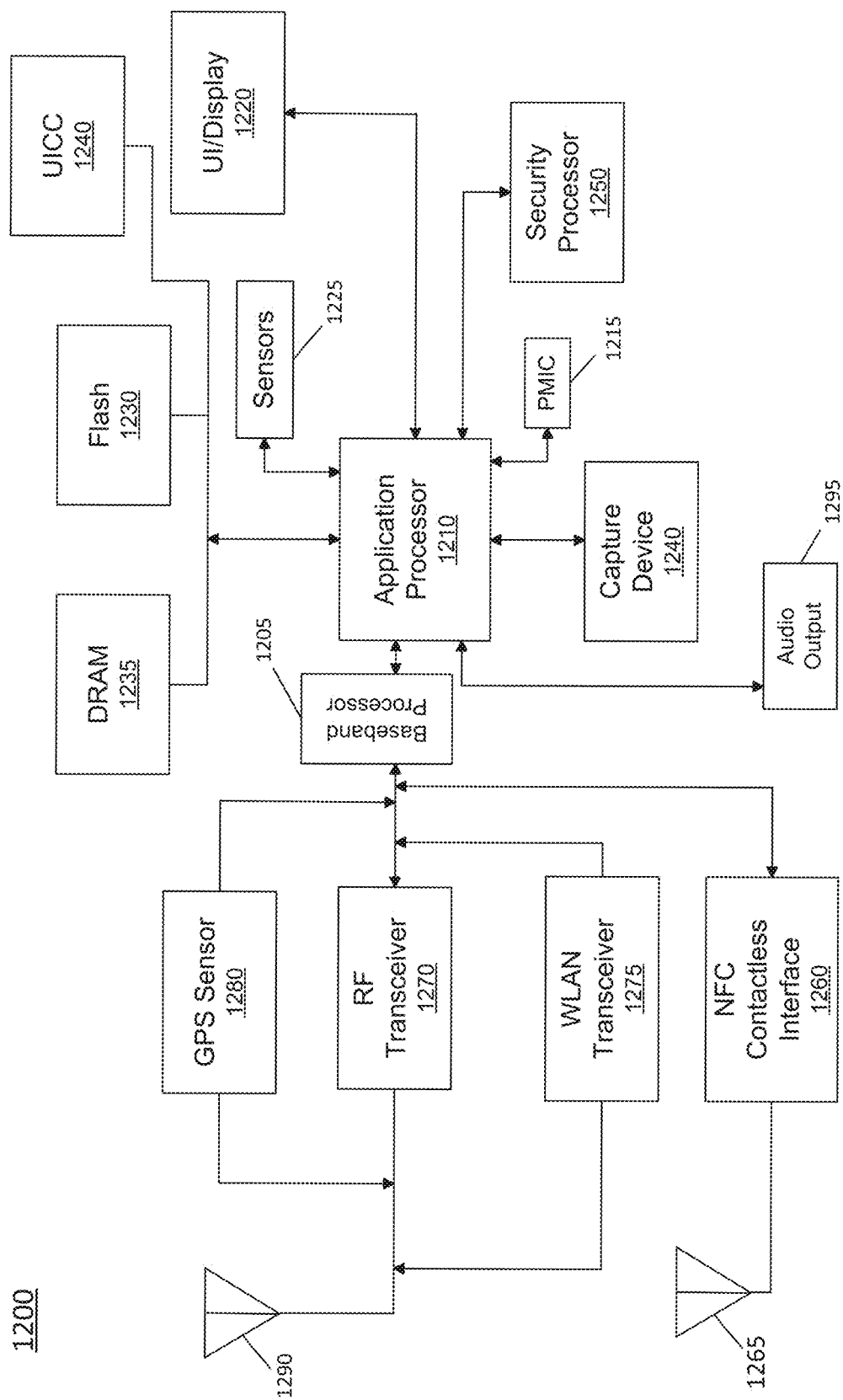
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
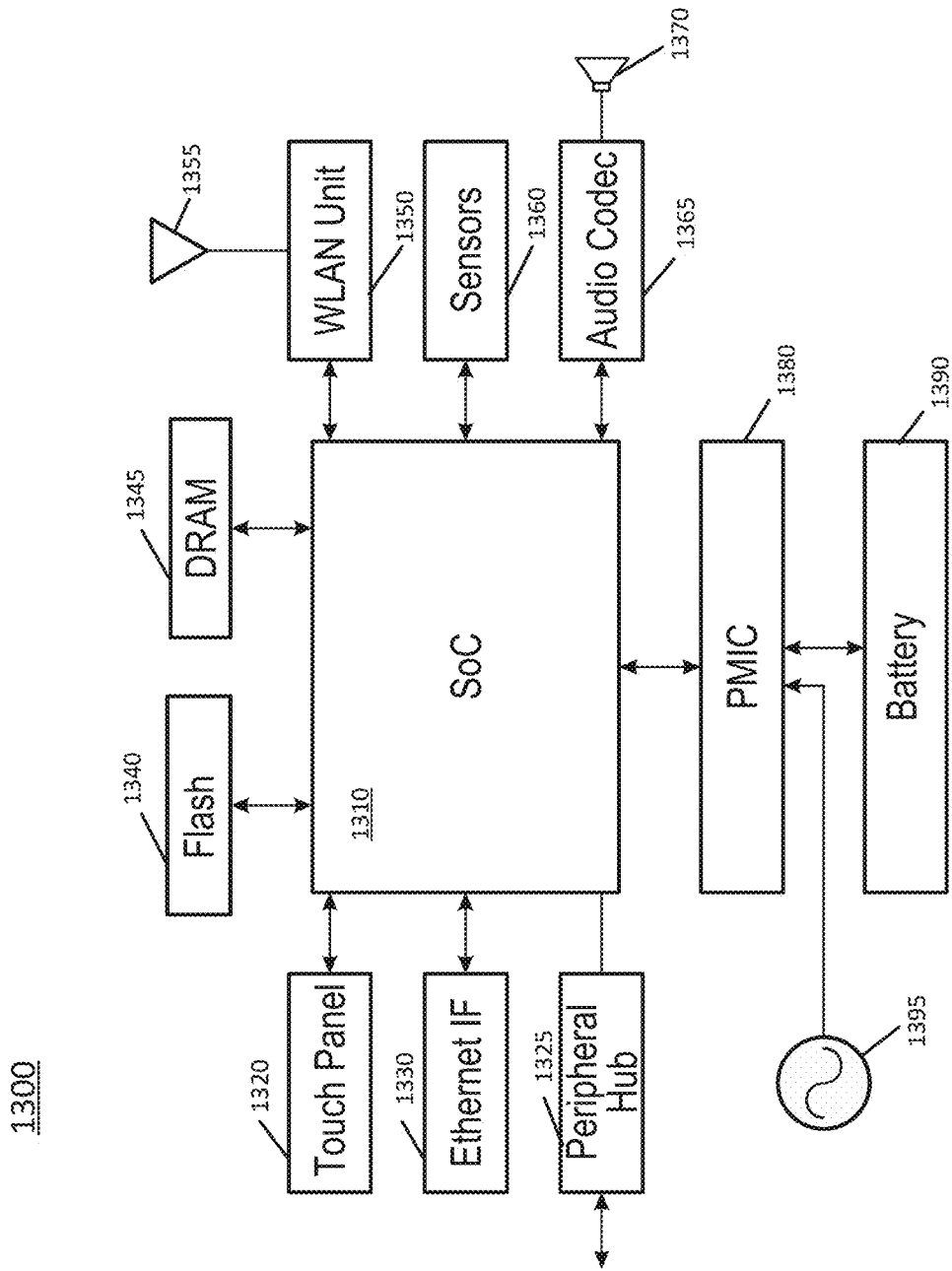
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
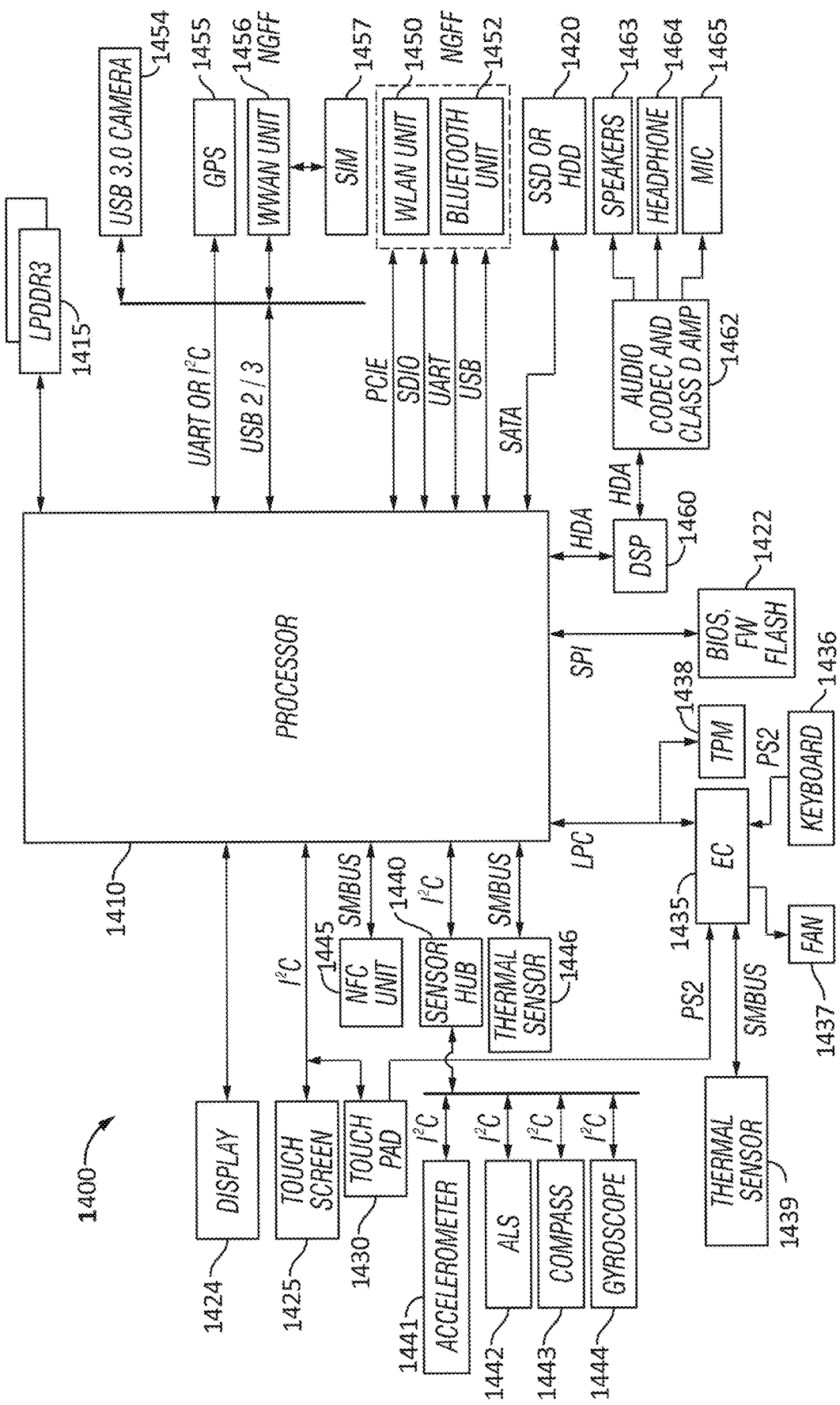
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400, and may include power management circuitry as described herein. As one example, processor 1410 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth™ unit 1452. Using WLAN unit 1450, Wi-Fi™ communications can be realized, while via Bluetooth™ unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
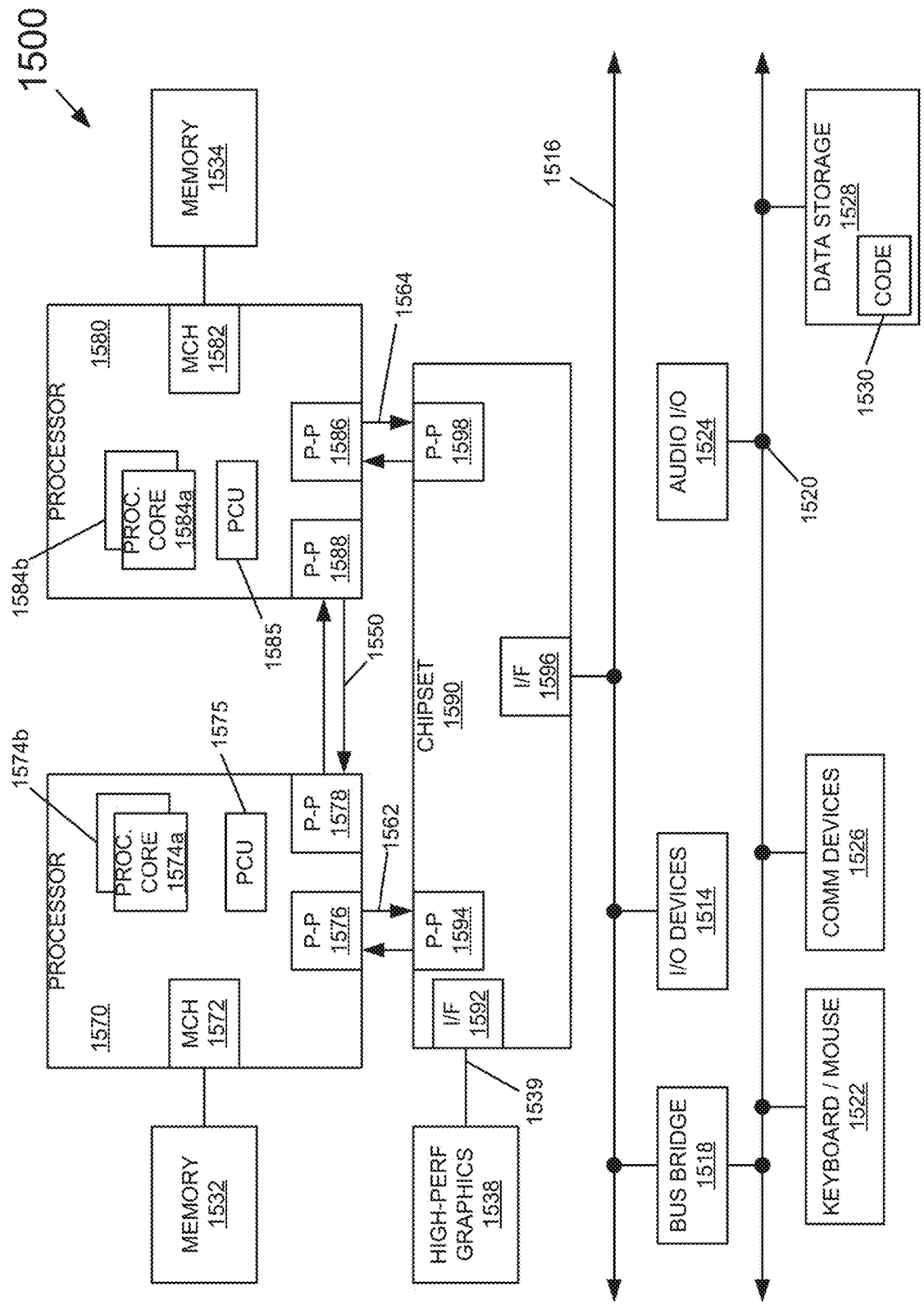
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors includes a PCU 1575, 1585 or other power management logic to perform processor-based power management, including the dynamic inclusion and removal of cores and other processing circuits into and from synchronization domains, to enable dynamic loose lock-step P-state control, as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™' or so forth.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 16:
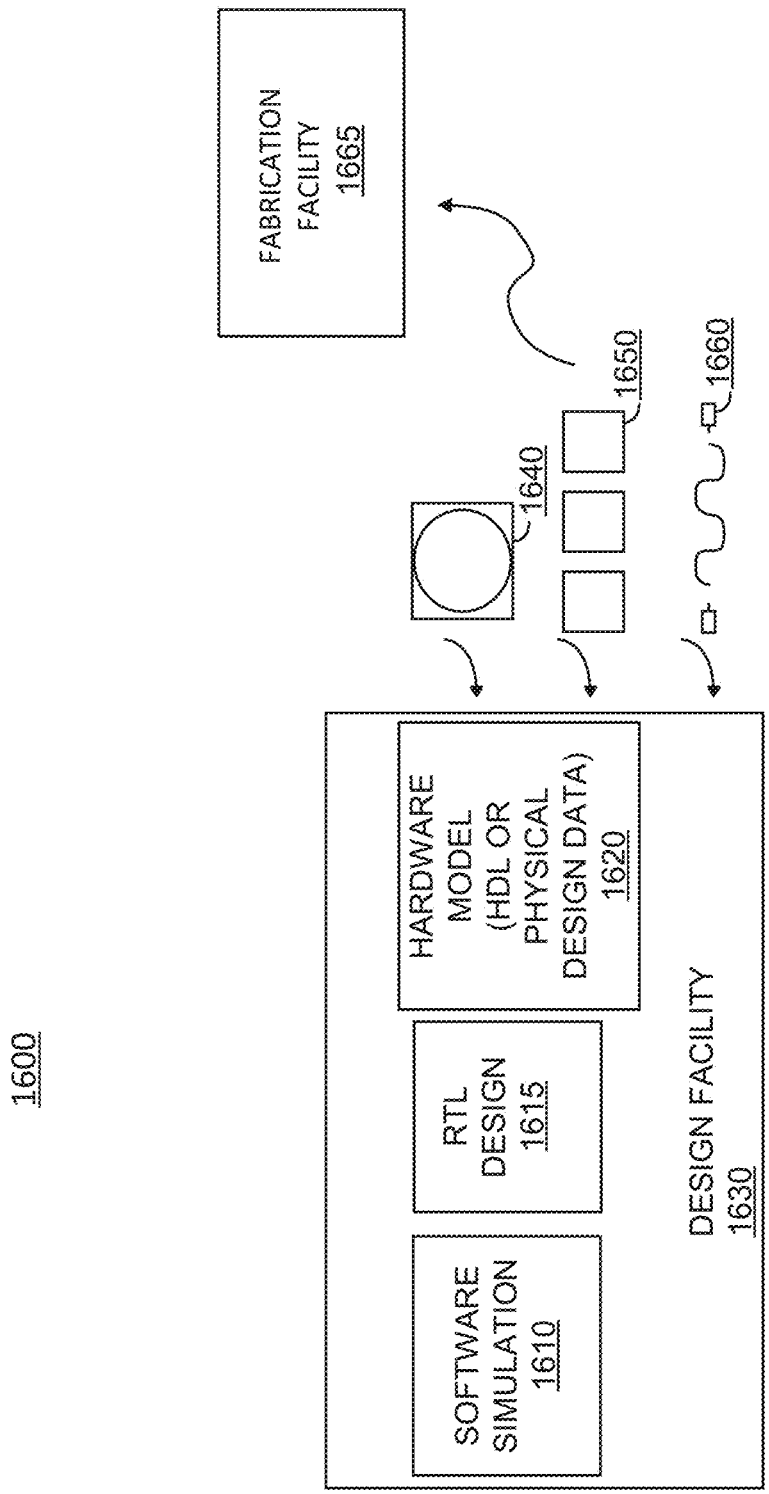
FIG. 16 is a block diagram illustrating an IP core development system used to manufacture an integrated circuit to perform operations according to an embodiment.

FIG. 16 is a block diagram illustrating an IP core development system 1600 that may be used to manufacture an integrated circuit to perform operations according to an embodiment. The IP core development system 1600 may be used to generate modular, re-usable designs that can be incorporated into a larger design or used to construct an entire integrated circuit (e.g., an SoC integrated circuit). A design facility 1630 can generate a software simulation 1610 of an IP core design in a high level programming language (e.g., C/C++). The software simulation 1610 can be used to design, test, and verify the behavior of the IP core. A register transfer level (RTL) design can then be created or synthesized from the simulation model. The RTL design 1615 is an abstraction of the behavior of the integrated circuit that models the flow of digital signals between hardware registers, including the associated logic performed using the modeled digital signals. In addition to an RTL design 1615, lower-level designs at the logic level or transistor level may also be created, designed, or synthesized. Thus, the particular details of the initial design and simulation may vary.

The RTL design 1615 or equivalent may be further synthesized by the design facility into a hardware model 1620, which may be in a hardware description language (HDL), or some other representation of physical design data. The HDL may be further simulated or tested to verify the IP core design. The IP core design can be stored for delivery to a third party fabrication facility 1665 using non-volatile memory 1640 (e.g., hard disk, flash memory, or any non-volatile storage medium). Alternately, the IP core design may be transmitted (e.g., via the Internet) over a wired connection 1650 or wireless connection 1660. The fabrication facility 1665 may then fabricate an integrated circuit that is based at least in part on the IP core design. The fabricated integrated circuit can be configured to perform operations in accordance with at least one embodiment described herein.

Figure 17:
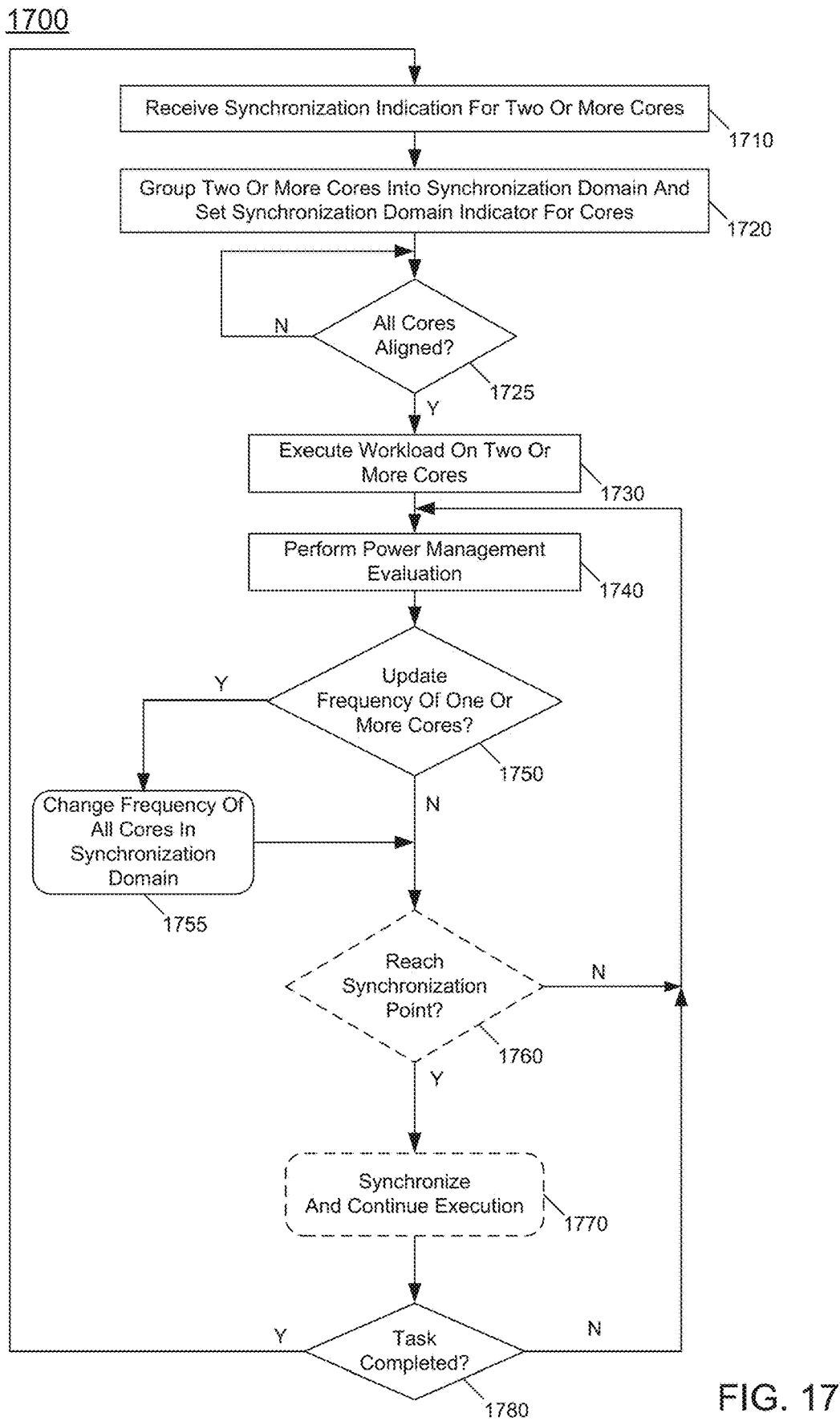
FIG. 17 is a flow diagram of a method in accordance with an embodiment of the present invention.

Referring now to FIG. 17, shown is a flow diagram of a method in accordance with an embodiment of the present invention. In the embodiment of FIG. 17, method 1700 may be used to set multiple cores as a collective entity or synchronization domain for purposes of enabling redundant operation on such cores. In addition, method 1700 describes at a high level loose lock-step performance state control as described herein. As such, method 1700 may be performed by hardware circuitry, firmware, software and/or combinations thereof. In some embodiments, method 1700 may be performed by an OS scheduler in connection with a PCU or other power controller. In other cases, another redundant scheduler may control initiation of a synchronization domain for redundancy purposes as described herein. Also, understand that while embodiments are described in connection with redundancy-based synchronization, the scope of the present invention is not limited in this regard and in other cases, synchronization operations may be performed in other situations such as two compute workloads that are to end at the same time.

As illustrated in FIG. 17, method 1700 begins first by performing synchronization operations before a given task is executed. In general, selected cores are allocated to a synchronization domain and after all cores within this domain synchronize, execution begins with all cores starting together. During the course of such synchronized execution, power management actions may be performed collectively as to all cores of the synchronization domain. As will be further described, optionally synchronization points may occur during such operation.

As illustrated in FIG. 17, method 1700 begins by receiving a synchronization indication for two or more cores (block 1710). Understand that this synchronization indication may be triggered by scheduling of an application or other task that is to be executed redundantly on multiple cores to improve accuracy, safety, reliability or so forth. In an embodiment, the application may trigger this indication of synchronization, which may be received by an OS scheduler. In response to this synchronization indication, two or more cores may be grouped into a synchronization domain.

Still with reference to FIG. 17, to group these two or more cores together, a synchronization domain indicator may be set for these cores (block 1720). For example, a MSR or other configuration storage may provide one or more fields for synchronization domain indicators. In a particular embodiment, each core may have an entry in such configuration storage, where a synchronization domain identifier of a synchronization domain field can be stored to indicate a given synchronization domain with which the core is associated. In one embodiment, this field may be a four-bit field, such that 16 different synchronization domains are possible. When a given field stores a value of, e.g., zero, this indicates that the given core is not currently a member of a given synchronization domain. Stated another way, this zero value for the synchronization domain field indicates that the given core can execute at independent frequency and voltage with respect to other cores. Note that in embodiments, the synchronization domain indicator can be saved and restored as part of a software thread context switch (e.g., via a XSAVE/XRESTORE operation).

Still referring to FIG. 17, control next passes to diamond 1725, where it is determined whether all cores are aligned. This alignment may include synchronization of the cores with respect to operating parameters including voltage and frequency. Such alignment may further include clearing the cores such that they may begin operation in a common state. When it is determined that all cores of the synchronization domain are aligned, control passes to block 1730 where a workload, e.g., of a given application, thread or other task under execution, may be executed on two or more cores of the synchronization domain. In some embodiments, this execution may be of a redundant workload in which two or more cores perform the same task using the same data. Understand that this execution may occur in loose lock-step fashion. During the execution, a power management evaluation may occur (block 1740). As will be described further with regard to FIG. 18 below, this power management evaluation may occur periodically during application execution by a PCU or other power controller. In a particular embodiment, this power management evaluation may occur according to a predetermined interval, e.g., approximately every 1 millisecond (ms).

Based on this power management evaluation, it can be determined whether a frequency of one or more cores within the synchronization domain is to be updated (diamond 1750). If so, control passes to block 1755 where a clock generator such as a PLL is instructed to update the frequency of all the cores in the synchronization domain, such that they maintain the same operating parameters.

In embodiments used for redundant execution, control optionally passes to diamond 1760 to determine whether a synchronization point in the execution has been reached (as illustrated by the dashed block). For example, a given application that is undergoing redundant execution may set various synchronization breakpoints at which execution is stopped and results (such as interim results) compared to ensure that correct operation inheres in both execution strands.

If it is determined that the synchronization point has not been reached yet, control passes to back to block 1740. Otherwise if it is determined that the synchronization point is reached, control passes to block 1770. At block 1770, results of the redundantly executed task on multiple cores may be synchronized and execution may continue. Note that one or the other core may reach this synchronization point slightly earlier than the other core, as the common operating parameter control of the cores happens in a loosely lock-step fashion, such that it is possible for a given core to reach a checkpoint some number of cycles prior to the other core. In an embodiment, the synchronization operation may include commitment of the execution result to the machine state. For example, this result (which may be an interim result or a final result) can be committed to the architectural state of the processor.

In some embodiments, if at the synchronization point operation at block 1770 it is determined that execution results do not match (or at least substantially match), an error may be raised (not shown for ease of illustration in FIG. 17). For example, this error may be sent to an error handler, e.g., within the application itself, an operating system or another location to determine how to resolve the error.

At this point it is determined whether execution (e.g.) of a redundant task is completed (diamond 1780). If not, control passes back to block 1730 discussed above. Understand while shown at this high level in the embodiment of FIG. 17, many variations and alternatives are possible.

Figure 18:
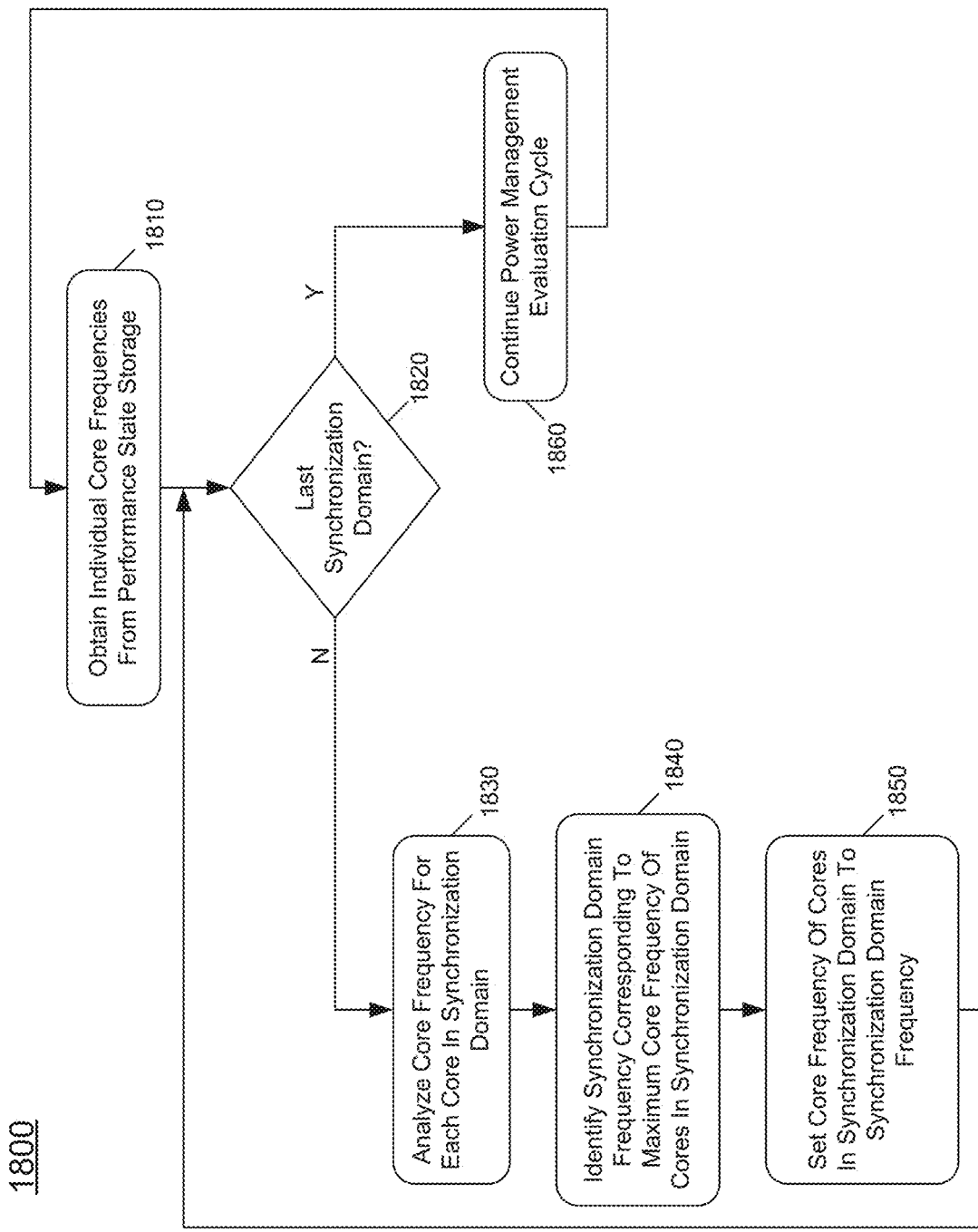
FIG. 18 is a flow diagram of a method in accordance with another embodiment of the present invention.

Referring now to FIG. 18, shown is a flow diagram of a method in accordance with another embodiment of the present invention. More specifically, method 1800 shown in FIG. 18 is a method for performing power control of cores within a synchronization domain as described herein. In embodiments, method 1800 may be performed by hardware circuitry, software, firmware and/or combinations thereof. In one particular embodiment, method 1800 may be performed by a PCU or other power controller. As such, method 1800 is an example representation of the power management evaluation described in block 1740 of FIG. 17.

As illustrated, method 1800 begins by obtaining individual core frequencies from each core or other processing engine in the processor (block 1810). In one embodiment, this information may be obtained from a storage such as a performance state stack, which stores current operating frequency and voltage among other operating parameters for each core within the processor. In an embodiment in which a core has hardware support for multiple (e.g., two) hardware threads, the multiple threads can be consolidated to a single value representing the maximum frequency of the threads of the core. Control next passes to diamond 1820 to determine whether there is another synchronization domain for consideration.

If so (meaning a current synchronization domain is not the last synchronization domain), control passes to block 1830 to analyze the core frequency for each core within the synchronization domain. As one representative example, assume a synchronization domain includes two cores. In this analysis process, the PCU may collect the indicated core frequency for both of these cores and place them, e.g., in a temporary storage. Control next passes to block 1840 where a synchronization domain frequency can be identified. In a particular embodiment, this synchronization domain frequency may be identified as the maximum of all core frequencies for the cores within the synchronization domain. In the example above with two cores in a synchronization domain, the synchronization domain frequency may correspond to the core frequency that is the higher of these two cores. In another case, the utilization of all cores that belong to the same synchronization domain can be calculated. In this way, a common frequency can be identified to handle dependency between cores and avoid performance loss in case of producer/consumer threads, for example.

Note also that various consolidation rules can apply. For example, if one core of the synchronization domain enters a sleep state, voting rights can be maintained (e.g., considering the frequency of core at the sleep state, or alternately ignoring it). Control next passes to block 1850 where all cores within the synchronization domain may have their core frequency set to this synchronization domain frequency (which at this point is a target frequency). Control loops back to diamond 1820.

When it is determined that there are no further synchronization domains to be analyzed, control passes to block 1860 where continued power management analysis operations may proceed. As an example, such operations may include identifying whether there are any constraints on enabling the processor to operate at the identified core frequencies, such as a thermal constraint, power constraint or so forth. For example, the analysis may include evaluating if the resolved target frequency of all cores can fit into other processor constraints such as a maximum current load, power budget, or so forth. If this is not the case, the consolidated (synchronization domain) target frequency can be furthered scaled down to fit within physical constraints of the processor, thus maintaining all cores of a synchronization domain locked together.

Note that further in this power management evaluation cycle, a frequency transition command can be sent to the cores of a given synchronization domain to cause the cores to update their frequency to the synchronization domain frequency. Understand that depending upon the processor operation, this synchronization domain frequency may be that frequency identified in block 1840 for a given synchronization domain. Or, it may be a lower frequency (e.g., one or more bin frequencies lower or one or more P-states lower), in the case of identification of processor constraints including thermal constraints, power constraints and so forth. In such constrained environments, the synchronization domain frequency acts as a maximum possible frequency, but in the face of constraints, the actual frequency at which the synchronized cores may operate can be lower than this frequency. In different embodiments, this frequency transition command may be sent directly to each impacted core (e.g., via a broadcast message) in embodiments in which each core includes internal clock and voltage control circuit (such as an internal phase lock loop (PLL) and voltage regulator), via an internal (e.g., ring) interconnect. In other cases, this command can be sent to another entity that provides a core with an operating frequency and/or voltage. Note that some command issue and communication delay may occur, which is acceptable, so long as it is within permitted time bounds.

In this way, embodiments provide fine-grained power control, such that all cores need not be locked together, while reducing variation such that power inefficiencies and longer latencies are avoided. Embodiments may thus be used to meet, e.g., FuSa requirements, which may exist in various system implementations such as Internet of Things (IoT) systems, automotive systems, and so forth. Understand while shown at this high level in the embodiment of FIG. 18, many variations and alternatives are possible.

Figure 19:
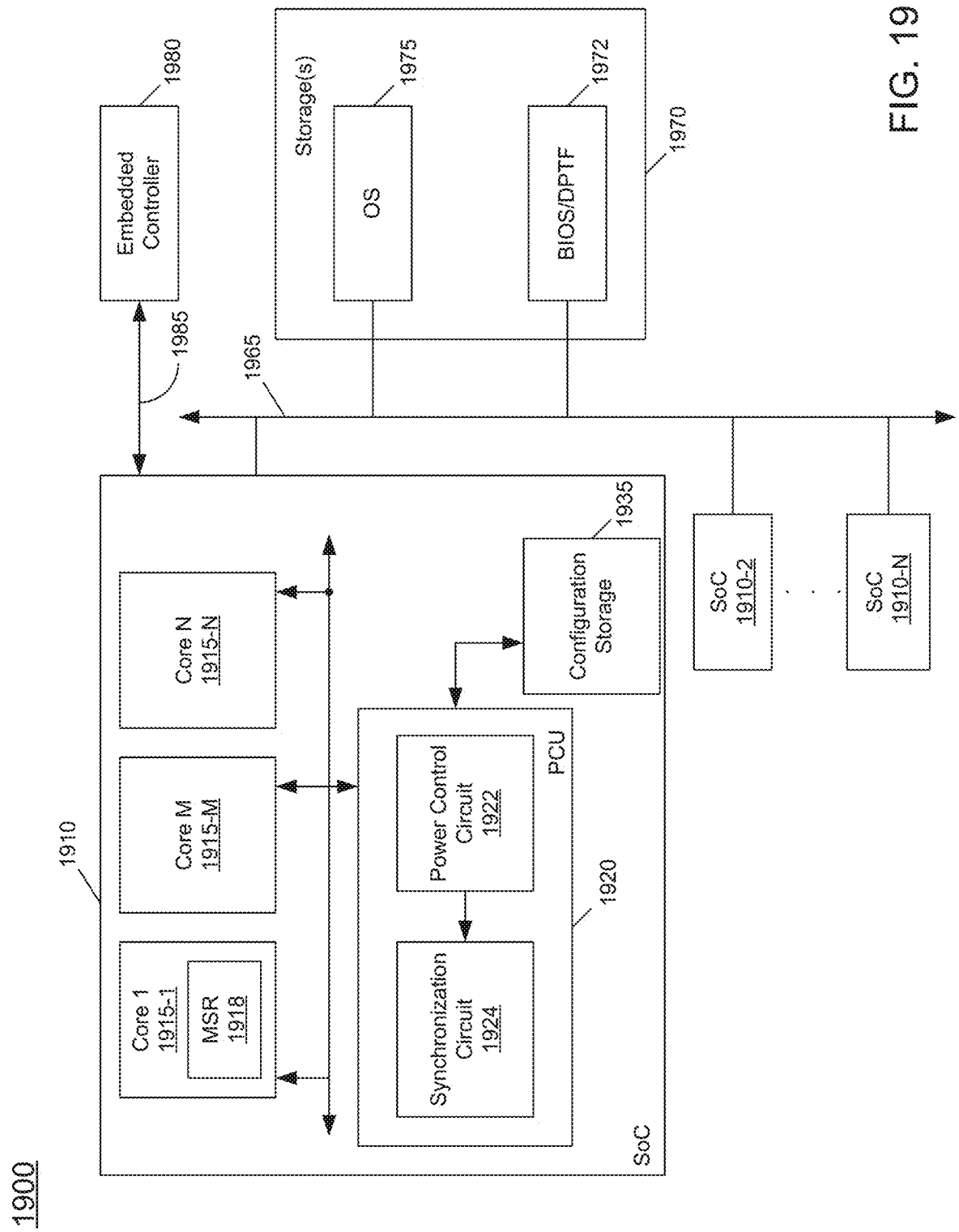
FIG. 19 is a block diagram of a system in accordance with an embodiment of the present invention.

Referring now to FIG. 19, shown is a block diagram of a system in accordance with an embodiment of the present invention. More specifically, a portion of a system 1900, which may be any of many different types of computing devices ranging from small portable devices, IoT systems, automotive systems, to full computing systems is shown, including a plurality of SoCs 1910 and 1910-2-1910-N, each of which may be a multicore processor or any other type of SoC.

As illustrated, to receive configuration information, including frequency and voltage information, platform-level power, thermal and other budgeting information and so forth, an interface 1965 couples SoC 1910 to storage(s) 1970. Understand that interface 1965 may be any type of interconnect or other interface mechanism. As an example, portions of the interface may be internal to one or more of SoC 1910 and storage(s) 1970. Still further, portions may be implemented, e.g., as traces or other interconnects on a circuit board that couples SoC 1910 and storage(s) 1970 together.

As illustrated, representative SoC 1910 includes multiple cores 1915$_1$-1915$_n$, each of which may be independently controlled to operate in one or more different P-states and/or C-states. As illustrated in representative core 1915-1, an MSR 1918 is present. Of course each core 1915 may include a corresponding MSR. In embodiments herein, MSR 1918 may include a synchronization domain field to indicate whether the given core is included in a synchronization domain (and further including an identity of such synchronization domain). Cores 1915 (generically) couple to a power control unit 1920. In embodiments, PCU 1920 may perform various power management techniques, including dynamic voltage and frequency control. Still further, PCU 1920 may dynamically control one or more cores 1915 to enter into and exit from synchronization domains. In the embodiment shown, PCU 1920 includes a power control circuit 1922 which may perform various power management activities. Still further, PCU 1920 includes a synchronization circuit 1924 which, responsive to control information received from power control circuit 1924, may control entry of cores into and exit from a given synchronization domain. For example, synchronization circuit 1924, responsive to receipt of a synchronization domain indication, may cause multiple cores 1915 to enter into a synchronization domain such that the cores may operate in loose lock-step fashion as described herein. In an embodiment, synchronization circuit 1924, via power control circuit 1922 may read information from MSR 1918, including a synchronization domain indicator within the synchronization domain field to identify given cores of a synchronization domain and to perform the dynamic loose lock-step frequency and voltage control described herein. In embodiments, note that synchronization circuit 1924 may further cause this synchronization domain indicator to be written into corresponding MSRs 1918 upon initialization of a given synchronization domain.

Still with reference to FIG. 19, SoC 1910 further includes a configuration storage 1935, which may store a variety of configuration information for operation of the processor and power management operations, including the synchronization domain control described herein. To this end, e.g., one or more of a BIOS (and/or a dynamic power and thermal framework (DPTF)) 1972 and an OS 1975 may provide information via interface 1965, for storage into configuration storage 2135.

As further illustrated, in FIG. 19, an embedded controller 1980 couples to SoC 1910 via an interconnect 1985, which in an embodiment may be a platform environment control interface (PECI) interconnect. In embodiments, embedded controller 1980 may control platform-level power management and in some cases may be implemented as a power management integrated circuit (PMIC). Furthermore, based upon detected operating parameters of system 1900, embedded controller 1980 may communicate platform constraint information, which may be provided to PCU 1920 (and more specifically power control circuit 1922). Based on such information, power control circuit 1922 may cause synchronization circuit 1924 to reduce a synchronization domain frequency from a target synchronization domain frequency to a lower synchronization domain frequency (e.g., one or more bin frequencies and/or P-state frequencies lower) to accommodate the given platform and/or processor constraint. Understand while shown at this high level in the embodiment of FIG. 19, many variations and alternatives are possible.

Figure 20:
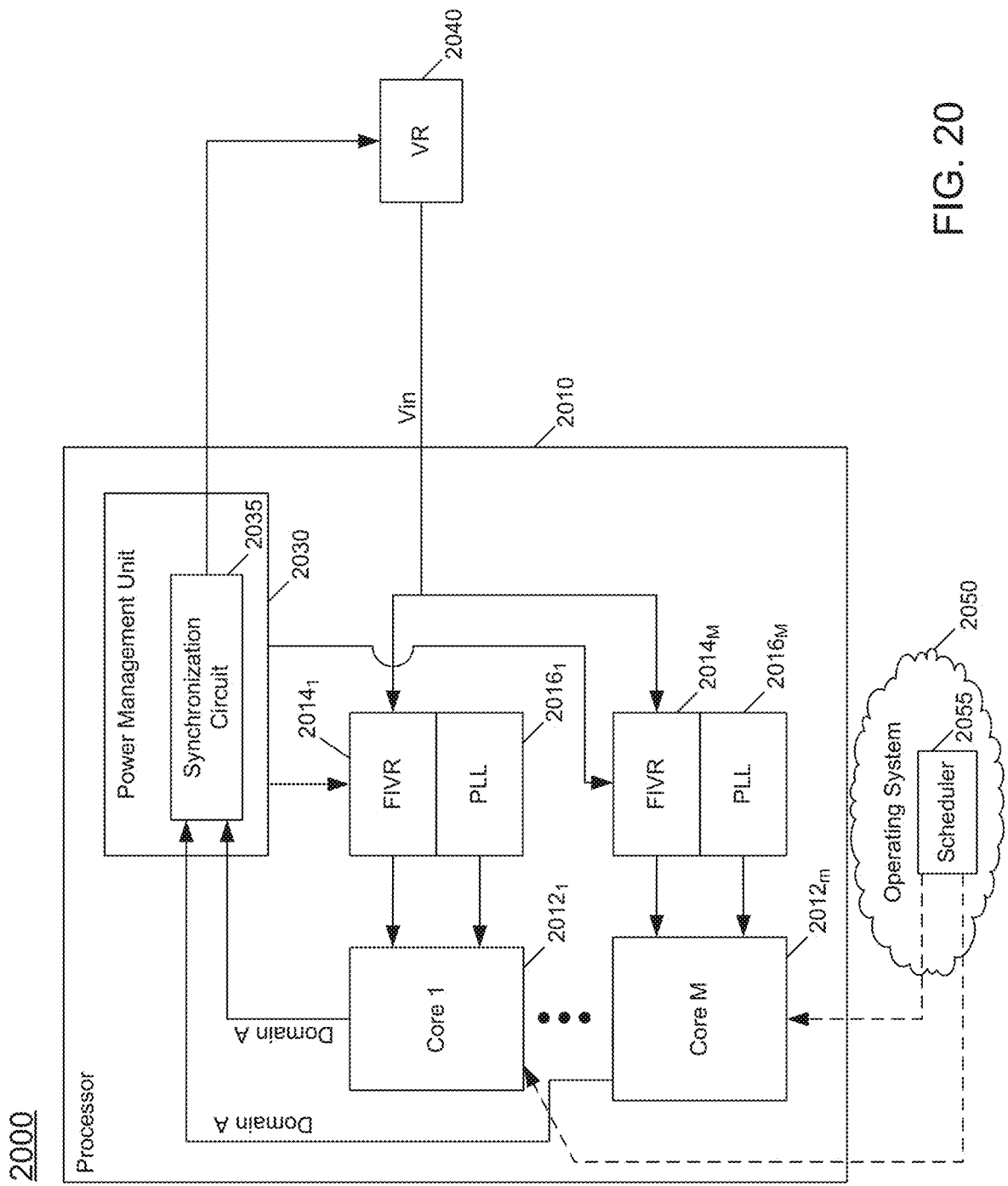
FIG. 20 is a block diagram of a system in accordance with another embodiment of the present invention.

Referring now to FIG. 20, shown is a block diagram of a system in accordance with another embodiment of the present invention. As illustrated in FIG. system 2000 may be any type of computing system that includes a processor 2010. Processor 2010 receives one or more operating voltages from a voltage regulator 2040. In execution, processor 2010 may execute an operating system 2050 that includes a scheduler component 2055. In some cases, scheduler 2055 may be responsible for initiating core allocations into a given synchronization domain when called for by a particular workload to be executed on processor 2010.

In the embodiment shown in FIG. 20, processor 2010 is a multicore processor including a plurality of cores $2012_1$-$2012_M$. Each core may be independently controlled to receive an independent operating voltage and frequency by way of corresponding fully integrated voltage regulators (FIVRs) $2014_1$-$2014_M$ and PLL's $2016_1$-$2016_M$.

As further illustrated, processor 2010 also includes a power management unit 2030 that itself includes a synchronization circuit 2035. In embodiments herein, synchronization circuit 2035, in response to an indication of synchronization for multiple cores, e.g., received from scheduler 2055, may cause multiple cores 2012 to be allocated to a given synchronization domain and controlled to operate at a common operating point (e.g., voltage and frequency) in a loose lock-step manner as described herein.

To initiate synchronization operation, scheduler 2055 may take all threads that belong to the same synchronization domain and schedule them on a given subset of cores 2012. When scheduling, it may write, e.g., in a MSR, domain information (including a domain number). This information is communicated to power management unit 2030 (e.g., to synchronization circuit 2035). In response to this information, synchronization circuit 2035 may manage such core subset as a single synchronization domain. At this point, cores 2012 within this synchronization domain may wait for their frequencies to align (either via an indication sent by core-to-core communication or via feedback from power management unit 2030). Then execution within the synchronization domain may begin on the subset of cores 2012 within the synchronization domain. Understand while shown at this high level in the embodiment of FIG. 20, many variations and alternatives are possible.

The following examples pertain to further embodiments.

In one example, a processor comprises: a first core; a second core, where the first core and the second core are to execute a task redundantly; a configuration register to store a first synchronization domain indicator to indicate that the first core and the second core are associated with a first synchronization domain; and a power controller including a synchronization circuit to cause a dynamic adjustment to a frequency of at least one of the first core and the second core to cause the first core and the second core to operate at a common frequency, based on the first synchronization domain indicator.

In an example, in response to the first synchronization domain indicator, the power controller is to cause the first core and the second core to operate at a synchronization domain frequency that is a maximum of a first frequency of the first core and a second frequency of the second core.

In an example, the synchronization circuit is to dynamically associate the first synchronization domain indicator with the first core and the second core in response to scheduling of a redundant application to the first core and the second core.

In an example, the synchronization circuit is to dynamically de-associate the first synchronization domain indicator with the first core and the second core after completion of the redundant application, and where after the de-association the first core and the second core are to operate at differing frequencies.

In an example, the processor further comprises a ring interconnect to couple the first core and the second core to the power controller, where the power controller is to send a frequency transition command to the first core and the second core to cause the first core and the second core to operate at the common frequency.

In an example, via the ring interconnect, the first core and the second core are to receive the frequency transition command at different time instants such that the first core and the second core begin operation at the common frequency asynchronously within a time bound duration.

In an example, one of the first core and the second core is to complete the redundant execution of the task prior to the other of the first core and the second core, and within a predetermined time duration.

In an example, the processor further comprises a redundancy circuit to compare a first result of the redundant execution of the task on the first core to a second result of the redundant execution of the task on the second core, and raise an error if the first result does not at least substantially match the second result.

In an example, the redundancy circuit is to enable the first result to be committed in response to the first result matching the second result.

In an example, the configuration register is to store a non-synchronization domain indicator for one or more other cores to indicate that the one or more other cores can operate at independent frequencies with respect to each other.

In an example, the configuration register includes a plurality of core portions each associated with a core, where each of the plurality of core portions includes a synchronization domain field to store a synchronization domain indicator for the associated core.

In another example, a method comprises: during execution of an application, receiving an indication that a first set of cores of a multicore processor are to be placed into a first synchronization domain; identifying a current core frequency of each of the first set of cores; identifying a first synchronization domain frequency corresponding to a maximum one of the current core frequency of each of the first set of cores; and causing the first set of cores to operate at the first synchronization domain frequency.

In an example, the method further comprises receiving the indication in response to an initiation of a task of the application to be executed redundantly on the first set of cores.

In an example, the method further comprises dynamically de-associating the indication from the first set of cores after completion of the redundant task, and where after the de-association at least some of the first set of cores are to operate at differing frequencies.

In an example, the method further comprises sending, from a power controller via an interconnect that couples the power controller to the first set of cores, a frequency transition command to the first set of cores to cause the first set of cores to operate at the first synchronization domain frequency and in response to the frequency transition command, the first set of cores are to operate at the first synchronization domain frequency in loose lock-step fashion.

In an example, the method further comprises, after receiving the frequency transition command, executing a redundant task of the application on the first set of cores, where a first core of the first set of cores completes the redundant task prior to and within a predetermined time duration of completion of the redundant task on a second core of the first set of cores.

In an example, the method further comprises: identifying at least one constraint on the multicore processor and determining a second synchronization domain frequency less than the first synchronization domain frequency; and causing the first set of cores to operate at the second synchronization domain frequency.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises a multicore processor, a platform controller, and a system memory. The multicore processor may have a plurality of cores each having a first storage to store a synchronization domain indicator having a first value to indicate that the core is to operate at an independently controlled performance state and a second value to indicate that the core is associated with a synchronization domain and to operate at a synchronized performance state with one or more other cores of the plurality of cores, the multicore processor further including a power controller including a synchronization circuit to cause a dynamic adjustment to a frequency of at least one of the plurality of cores to cause the at least one core to operate at the synchronized performance state, in response to the second value of the synchronization domain indicator. The platform controller may be coupled to the multicore processor to communicate platform environmental information to the multicore processor, and the system memory also may be coupled to the multicore processor.

In an example, the synchronization circuit is to cause the at least one core and a second core to operate at the synchronized performance state to enable execution of a redundant task on the at least one core and the second core in loose lock-step, and after the execution of the redundant task to cause the at least one core and the second core to operate at independent performance states.

In an example, in response to the synchronization domain indicator having the second value, the power controller is to cause the at least one core and the second core to operate at one of: a first synchronization domain frequency that is a maximum of a first frequency of the at least one core and a second frequency of the second core; and a second synchronization domain frequency that is less than the first synchronization domain frequency in response to identification of a constraint on the multicore processor.

In another example, an apparatus comprises: means for receiving an indication that a first set of cores of a multicore processor are to be placed into a first synchronization domain; means for identifying a current core frequency of each of the first set of cores; means for identifying a first synchronization domain frequency corresponding to a maximum one of the current core frequency of each of the first set of cores; and means for causing the first set of cores to operate at the first synchronization domain frequency.

In an example, the apparatus further comprises means for dynamically de-associating the indication from the first set of cores after completion of a redundant task, and where after the de-association at least some of the first set of cores are to operate at differing frequencies.

In an example, the apparatus further comprises means for sending a frequency transition command to the first set of cores to cause the first set of cores to operate at the first synchronization domain frequency and in response to the frequency transition command, the first set of cores are to operate at the first synchronization domain frequency in loose lock-step fashion.

In an example, the apparatus further comprises means for executing a redundant task on the first set of cores, where a first core of the first set of cores completes the redundant task prior to and within a predetermined time duration of completion of the redundant task on a second core of the first set of cores.

In an example, the apparatus further comprises: means for identifying at least one constraint on the multicore processor and determining a second synchronization domain frequency less than the first synchronization domain frequency; and means for causing the first set of cores to operate at the second synchronization domain frequency.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first core comprising:
a fetch circuit to fetch instructions;
a decode circuit to decode the instructions;
an execution circuit to execute arithmetic and logic operations;
a second core comprising:
a second fetch circuit to fetch instructions;
a second decode circuit to decode the instructions;
a second execution circuit to execute arithmetic and logic operations,
wherein in a first mode the first core and the second core are to operate at a common frequency, and in a second mode the first core and the second core are to operate at independent frequencies;
memory to store a first indicator, the first indicator to have a first value to indicate that the first core and a second core are to execute in the first mode to redundantly execute a first task at the common frequency; and
a controller to cause the first core and the second core to operate in the second mode at the independent frequencies, and thereafter operate in the first mode at the common frequency to redundantly execute the first task based at least in part on the first value of the first indicator.

2. The apparatus of claim 1, further comprising a cluster comprising the first core and the second core.

3. The apparatus of claim 2, further comprising a third core, wherein the controller is to cause the third core to execute a second task different than the first task.

4. The apparatus of claim 3, wherein the third core is heterogeneous to the first core.

5. The apparatus of claim 3, wherein the controller is to cause the third core to execute the second task while the first core and the second core execute the first task redundantly.

6. The apparatus of claim 1, wherein the controller is to cause the first core and the second core to operate at the independent frequencies based at least in part on a second value of the first indicator.

7. The apparatus of claim 1, wherein the apparatus is to perform a functional safety application in the first mode.

8. The apparatus of claim 1, wherein the controller comprises a power controller.

9. The apparatus of claim 8, wherein the power controller is to cause at least the first core to perform dynamic frequency scaling.

10. The apparatus of claim 8, wherein the power controller is to cause at least the first core to enter into a retention mode in which a retention voltage is provided to at least the first core.

11. The apparatus of claim 1, wherein the first core is to execute main code and the second core is to execute checker code.

12. The apparatus of claim 1, further comprising a redundancy circuit to compare a first result of the redundant execution of the first task on the first core to a second result of the redundant execution of the first task on the second core, and to raise an error if the first result does not at least substantially match the second result.

13. The apparatus of claim 1, wherein the controller is to set the common frequency to be a highest of the independent frequencies.

14. A system on chip comprising:
a central processing circuit (CPU) comprising:
a first core;
a second core, wherein the first core and the second core are to execute a first task redundantly;
a graphics processing circuit (GPU) coupled to the CPU, the GPU comprising at least one graphics engine to perform graphics processing;
memory to store a first indicator, the first indicator to have a first value to indicate that the first core and the second core are to redundantly execute the first task; and
a controller to cause the first core and the second core to operate at independent frequencies, and thereafter to operate at a common frequency to redundantly execute the first task based at least in part on the first value of the first indicator.

15. The system on chip of claim 14, wherein the controller is to cause the first core and the second core to operate at the independent frequencies based at least in part on a second value of the first indicator.

16. The system on chip of claim 14, wherein the second core is to redundantly execute the first task within 1 to 10,000 execution cycles of the first task by the first core.

17. The system on chip of claim 14, further comprising a redundancy circuit to compare a first result of the redundant execution of the first task on the first core to a second result of the redundant execution of the first task on the second core.

18. An apparatus comprising:
a first core;
a second core;
a storage to store a first indicator, wherein the first indicator is to indicate that the first core and the second core are to redundantly execute a first task when the first indicator has a first value; and
a controller coupled to the storage, wherein the controller is to cause the first core and the second core to operate with independent core operation and thereafter to operate with redundancy in lockstep operation,
wherein, in the redundancy in lockstep operation the first core and the second core are to operate at a common frequency to redundantly execute the first task based at least in part on the first value of the first indicator, and wherein, in the independent core operation the first core and the second core are to operate at independent frequencies based at least in part on a second value of the first indicator.

19. The apparatus of claim 18, wherein the controller is to cause the first core and the second core to operate at the common frequency that is a highest of the independent frequencies.

20. The apparatus of claim 18, further comprising a security processor.

* * * * *

UNITED STATES PATENT AND TRADEMARK OFFICE
CERTIFICATE OF CORRECTION

| | |
|---|---|
| PATENT NO. | : 12,265,440 B2 |
| APPLICATION NO. | : 18/455008 |
| DATED | : April 1, 2025 |
| INVENTOR(S) | : Efraim Rotem et al. |

Page 1 of 1

It is certified that error appears in the above-identified patent and that said Letters Patent is hereby corrected as shown below:

In the Claims

Column 32
Line 64 "wherein, in the redundancy in lockstep operation the first" should read --wherein, in the redundancy in lockstep operation, the first--

Column 33
Line 1 "wherein, in the independent core operation the first core" should read --wherein, in the independent core operation, the first core--

Signed and Sealed this
Tenth Day of June, 2025

Coke Morgan Stewart
*Acting Director of the United States Patent and Trademark Office*